US012197149B2

(12) United States Patent
Iwanaga

(10) Patent No.: US 12,197,149 B2
(45) Date of Patent: Jan. 14, 2025

(54) IMAGE FORMING APPARATUS

(71) Applicant: CANON KABUSHIKI KAISHA, Tokyo (JP)

(72) Inventor: Ayumu Iwanaga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/337,163

(22) Filed: Jun. 19, 2023

(65) Prior Publication Data

US 2023/0418189 A1 Dec. 28, 2023

(30) Foreign Application Priority Data

Jun. 24, 2022 (JP) ................................. 2022-102275

(51) Int. Cl.
*G03G 15/16* (2006.01)

(52) U.S. Cl.
CPC ................................ *G03G 15/1615* (2013.01)

(58) Field of Classification Search
CPC ............. G03G 15/1615; G03G 15/161; G03G 15/1605; G03G 2215/00738; G03G 2215/0129
See application file for complete search history.

(56) References Cited

U.S. PATENT DOCUMENTS

| | | | | |
|---|---|---|---|---|
| 8,406,658 | B2 * | 3/2013 | Kaseda | G03G 15/1605 399/121 |
| 2020/0310306 | A1 * | 10/2020 | Yamana | G03G 15/0136 |
| 2021/0356886 | A1 * | 11/2021 | Tajima | G03G 15/0189 |
| 2021/0397112 | A1 * | 12/2021 | Tsuruga | G03G 15/502 |

FOREIGN PATENT DOCUMENTS

| | | | | |
|---|---|---|---|---|
| JP | H0980926 A | 3/1997 | | |
| JP | 2019200283 A | 11/2019 | | |
| JP | 2021117265 A | 8/2021 | | |
| WO | WO-2020171215 A1 * | 8/2020 | | G03G 15/0189 |

* cited by examiner

*Primary Examiner* — Jessica L Eley
(74) *Attorney, Agent, or Firm* — Canon U.S.A., Inc. I.P. Division

(57) ABSTRACT

An image forming apparatus includes a belt, tension rollers having an inner roller and an upstream roller, a pressing member, a holding mechanism, a cam member, and a cam follower member. The pressing member is contactable with an inner circumferential surface of the belt in a belt width direction at a position upstream of the inner roller and downstream of the upstream roller in a rotation direction of the belt. The pressing member presses the belt in a direction from the inner circumferential surface toward an outer circumferential surface of the belt. The cam follower member is provided in the holding mechanism to be moved. The cam follower member is fixable to the holding mechanism at one of a first position and a second position different from the first position so that the position of the pressing member is adjustable relative to the cam member located at a predetermined position.

8 Claims, 11 Drawing Sheets

IMAGE FORMING APPARATUS

BACKGROUND

Field

The present disclosure relates to an image forming apparatus such as an electrophotographic or electrostatic printer, a copying machine, a facsimile machine, or a multifunction peripheral having multiple functions of the machines.

Description of the Related Art

Some of existing electrophotographic image forming apparatuses include a rotatable seamless belt (hereinafter simply referred to as a "belt") serving as an image bearing member. An example of such a belt is an intermediate transfer belt serving as a second image bearing member. The intermediate transfer belt conveys a toner image primarily transferred, thereto, from a photosensitive member serving as a first image bearing member and secondarily transfers the toner image onto a sheet recording medium, such as a paper sheet. Hereinafter, description is mainly made with reference to an intermediate transfer type image forming apparatus including an intermediate transfer belt as an example.

In an image forming apparatus using an intermediate transfer belt, a toner image formed on a photosensitive member or the like in an image forming unit is primarily transferred to the intermediate transfer belt in a primary transfer unit. The toner image primarily transferred to the intermediate transfer belt is secondarily transferred to a recording medium in a secondary transfer unit. The secondary transfer unit consists of a secondary transfer inner member provided adjacent to an inner circumferential surface of the intermediate transfer belt and a secondary transfer outer member provided adjacent to the outer circumferential surface of the intermediate transfer belt. That is, the secondary transfer unit is a contact portion between the intermediate transfer belt and the secondary transfer outer member. As the secondary transfer inner member, a secondary transfer inner roller that is one of a plurality of tension rollers that apply tension to the intermediate transfer belt is used. As the secondary transfer outer member, a secondary transfer outer roller is mostly used. The secondary transfer outer roller is disposed opposingly across the intermediate transfer belt from the secondary transfer inner roller and is urged toward the secondary transfer inner roller. A voltage of opposite polarity to the toner's charge polarity is applied to the secondary transfer outer roller (or a voltage of the same polarity as the toner's charge polarity is applied to the secondary transfer inner roller), so that the toner image on the intermediate transfer belt is secondarily transferred onto the recording medium in the secondary transfer unit. Hereinafter, the terms "leading edge" and "trailing edge" of a recording medium refer to the leading edge and trailing edge of the recording medium in a conveyance direction. The term "upstream of the secondary transfer unit in a rotation direction of the intermediate transfer belt" is also simply referred to as "upstream of the secondary transfer unit".

To transfer a toner image formed on the intermediate transfer belt to a recording medium with high accuracy, the contact length between the intermediate transfer belt and the recording medium upstream of the secondary transfer unit in the rotation direction of the intermediate transfer belt is important. If the contact length is large, image defects may occur due to frictional sliding between the toner and the recording medium caused by the speed difference between the intermediate transfer belt and the recording medium. In contrast, if the contact length is small, image defects may occur due to electrical discharges that occur in the air gap between the recording medium and the intermediate transfer belt. Therefore, the posture of a conveyed recording medium and the tension layout of the intermediate transfer belt are determined in consideration of the abutment position of the leading edge of the recording medium against the intermediate transfer belt positioned upstream of the secondary transfer unit.

Japanese Patent Laid-Open No. H09-80926 describes a configuration in which a flatness correction member that contacts the inner circumferential surface of the intermediate transfer belt and presses the intermediate transfer belt is provided upstream of the abutment position (the tacking position) of the leading edge of the recording medium against the intermediate transfer belt in the rotation direction of the intermediate transfer belt. In Japanese Patent Laid-Open No. H09-80926, a flexible baffle plate or an elastic roll is used as the flatness correction member.

By contacting a pressing member (a backup member) with the inner circumferential surface of the intermediate transfer belt at a position upstream of the secondary transfer unit as described above, the shape (the posture) of the intermediate transfer belt at the position upstream of the secondary transfer unit can be made into a desired shape (a desired posture). According to the configuration, to set the contact length between the intermediate transfer belt and the recording medium to an appropriate length, the inner circumferential surface of the intermediate transfer belt is pressed down at a position upstream of the secondary transfer unit by the pressing member. Thus, the intermediate transfer belt is deformed into an appropriate shape (an appropriate posture). The pressing member is held by a holding device, and the amount of pressure applied to the intermediate transfer belt by the pressing member can be adjusted by changing the posture of the holding device. The posture of the holding device can be controlled by, for example, pushing the holding device with a cam mounted in, for example, the main body of the image forming apparatus or an intermediate transfer belt unit.

However, according to the configuration, the following issues arise. Suppose that one end in the longitudinal direction of the pressing member that is disposed in the width direction of the intermediate transfer belt (a direction substantially orthogonal to the movement direction of the surface of the intermediate transfer belt) is the front end, and the other end is the rear end. Then, a cam is provided to press the holding device at at least two points, that is, a front point and a rear point. At this time, due to the tolerances of the parts of the holding device, when the holding device is mounted in the main body of the image forming apparatus or the intermediate transfer belt unit, the distance between the holding device and the rotational axis of the cam at the front point may differ from that at the rear point and, thus, the amounts of pressure applied to the holding device may differ at the front and rear. In this case, a difference in the amount of pressure (the inroad amount) of the pressing member against the intermediate transfer belt occurs at the front and rear. If a difference in the amount of pressure of the pressing member against the intermediate transfer belt occurs at the front and rear, it is difficult to adjust the contact length between the intermediate transfer belt and the recording medium into an appropriate length uniformly in the width direction of the intermediate transfer belt. As a result, depending on a position in the intermediate transfer belt in the width direction, a region may be generated in which electric discharge occurs due to an air gap formed between the intermediate transfer belt and the recording medium. Conversely, a region may be generated in which image defects caused by frictional sliding of an image occur due to a long contact length between the intermediate transfer belt and the recording medium.

The issues about an existing image forming apparatus have been described above with reference to the secondary transfer unit, which is the transfer unit for transferring a toner image from the intermediate transfer belt to the recording medium, as an example. However, the same issues arise in a transfer unit for transferring a toner image from another belt-like image bearing member, such as a photosensitive member, to a recording medium.

SUMMARY

Accordingly, the present disclosure provides a technique to reduce the occurrence of the difference in amount of pressure the pressing member exerts against a belt in the longitudinal direction of the pressing member.

According to an aspect of the present disclosure, an image forming apparatus includes a belt that is rotatable, seamless, and configured to bear a toner image, a plurality of tension rollers configured to support the belt in a tensioned state, wherein the plurality of tension rollers includes an inner roller and an upstream roller disposed adjacent to and upstream of the inner roller in a rotation direction of the belt, an outer member disposed facing the inner roller, wherein the outer member abuts against an outer circumferential surface of the belt and forms a transfer unit configured to transfer the toner image from the belt to a recording medium, a pressing member contactable with an inner circumferential surface of the belt in a width direction of the belt at a position upstream of the inner roller and downstream of the upstream roller in the rotation direction of the belt, wherein the pressing member is capable of pressing the belt in a direction from the inner circumferential surface toward the outer circumferential surface, a holding mechanism that is movable and configured to hold the pressing member, a cam member configured to move the holding mechanism, and a cam follower member provided in the holding mechanism to be configured to be moved by the cam member, wherein the cam follower member is fixable to the holding mechanism at one of a first position and a second position different from the first position so that the position of the pressing member is adjustable relative to the cam member located at a predetermined position.

Further features of the present disclosure will become apparent from the following description of exemplary embodiments with reference to the attached drawings.

DESCRIPTION OF THE EMBODIMENTS

An image forming apparatus according to the present disclosure is described in more detail below with reference to the accompanying drawings.

First Embodiment

1. Architecture and Operation of Image Forming Apparatus

Figure 1:
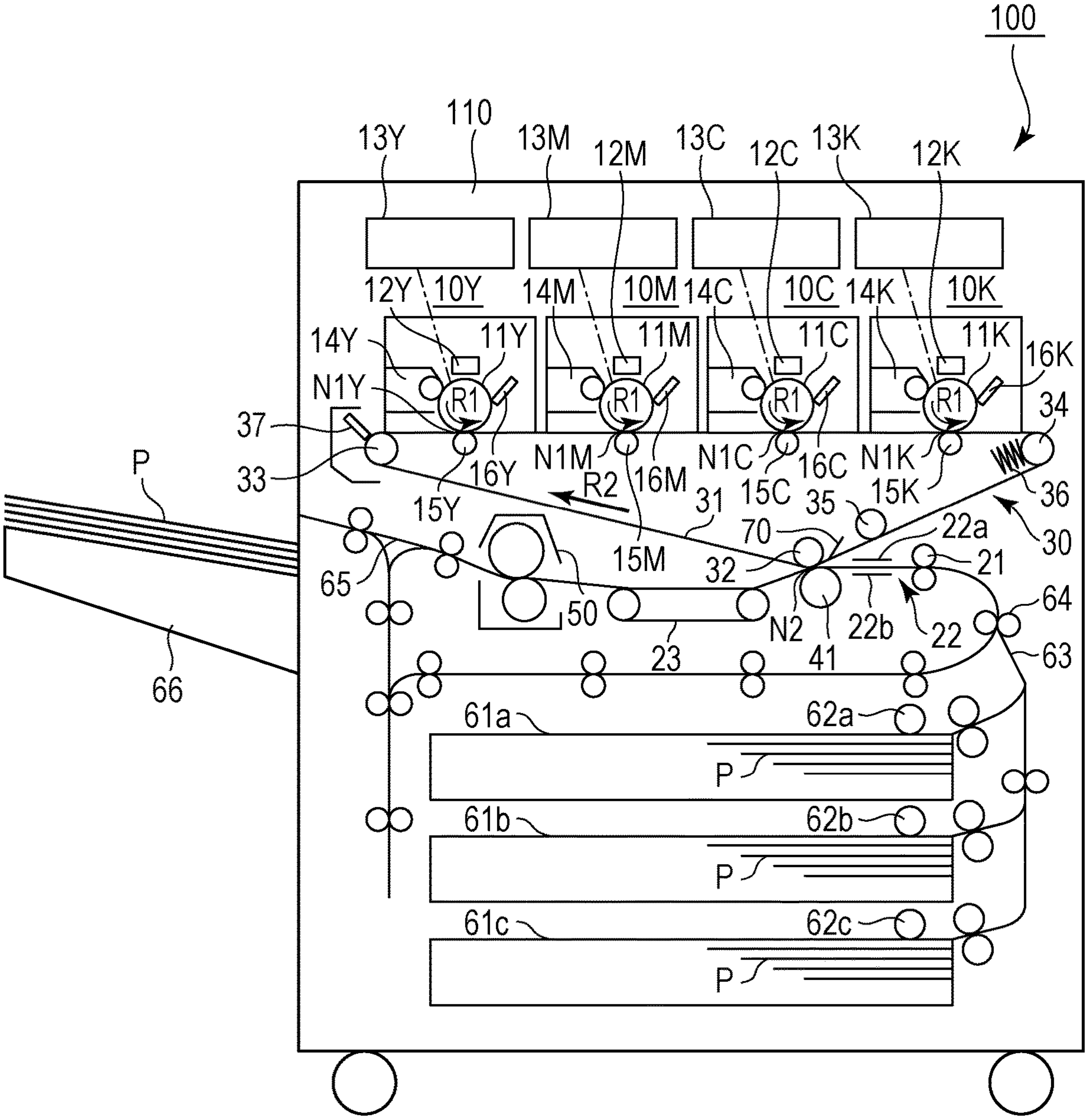
FIG. 1 is a schematic cross-sectional view of an image forming apparatus.

FIG. 1 is a schematic cross-sectional view of an image forming apparatus 100 according to the present embodiment. The image forming apparatus 100 according to the present embodiment is a tandem printer that employs an intermediate transfer method. The image forming apparatus 100 can form, using the electrophotographic method, a full-color image on a sheet-like recording medium P, such as a sheet of paper, on the basis of an image signal transmitted from an external device, such as a personal computer. The recording medium is also referred to as a transfer medium, sheet, printing medium, or medium.

When the image forming apparatus 100 and its elements are discussed, the “front” side refers to the side of the image forming apparatus 100 that faces in the direction out of the plane of FIG. 1 while the “rear” side refers to the opposite side (the side that faces in the direction into the plane of FIG. 1). The “front-rear” direction from the front side to the rear side is substantially parallel to the rotational axis directions of a photosensitive drum 11 (described below) and tension rollers of an intermediate transfer belt 31 (described below). In addition, when the image forming apparatus 100 and its elements are discussed, the “up-down” direction refers to the direction of gravitational force (the vertical direction). However, the upper or lower position from an element or position of interest in the up-down direction need not be immediately above or immediately below the element or position. The upper or lower position may be above or below the horizontal plane passing through the element or position of interest.

The image forming apparatus 100 includes four image forming units (stations) 10Y, 10M, 10C, and 10K that form yellow (Y), magenta (M), cyan (C), and black (K) images, respectively, as a plurality of image forming units (stations). The image forming units 10Y, 10M, 10C, and 10K are arranged in a line in the movement direction of the image transfer surface of the intermediate transfer belt 31 disposed substantially horizontally. Elements having the same or similar function or configuration in the image forming units 10Y, 10M, 10C, and 10K may be identified by a reference numeral without the last letter Y, M, C, or K, which indicates that the element is used for one of the colors and may be collectively described. According to the present embodiment, the image forming unit 10 includes a photosensitive drum 11 (11Y, 11M, 11C, 11K), a charging device 12 (12Y, 12M, 12C, 12K), an exposure device 13 (13Y, 13M, 13C, 13K), a developing device 14 (14Y, 14M, 14C, 14K), a primary transfer roller 15 (15Y, 15M, 15C, 15K), and a cleaning device 16 (16Y, 16M, 16C, 16K).

The image forming apparatus 100 includes the photosensitive drum 11, which is a rotatable drum-type (cylindrical) photosensitive member (electrophotographic photosensitive member) serving as a first image bearing member that bears a toner image. The photosensitive drum 11 is driven by a driving force transmitted from a drum drive motor (not illustrated) serving as a drive source and is rotated in the direction of arrow R1 (the counterclockwise direction) in FIG. 1 at a predetermined circumferential speed (a process speed). A surface of the rotating photosensitive drum 11 is uniformly charged to a predetermined potential of a predetermined polarity (negative polarity in the present embodiment) by the charging device 12 serving as a charging unit. During a charging process, a predetermined charging voltage (a charging bias) is applied to the charging device 12 by a charging power supply (not illustrated).

The surface of the photosensitive drum 11 subjected to the charging process is scanning-exposed by the exposure device 13 serving as an exposure unit in accordance with an image signal, and an electrostatic image (an electrostatic latent image) is formed on the photosensitive drum 11. According to the present embodiment, the exposure device 13 includes a laser scanner device that emits a laser beam modulated in accordance with the image signal (image information) onto the photosensitive drum 11. The electrostatic image formed on the photosensitive drum 11 is developed (visualized) by supplying toner serving as a developer from the developing device 14 serving as a developing unit, and a toner image (a developer image) is formed on the photosensitive drum 11. According to the present embodiment, an exposure portion (an image portion) of the photosensitive drum 11 is uniformly charged and, thereafter, is exposed, so that the absolute value of the potential of the exposure portion is decreased. The toner charged to a polarity the same as the charge polarity of the photosensitive drum 11 (negative polarity according to the present embodiment) is deposited to the exposure portion (a reversal developing method). During development, a predetermined development voltage (a development bias) is applied to the developing roller serving as a developer bearing member of the developing device 14 by a developing power supply (not illustrated). According to the present embodiment, the normal charge polarity of the toner, which is the main charge polarity of the toner during development, is negative polarity.

The intermediate transfer belt 31 that is a rotatable intermediate transfer member consisting of a seamless belt is disposed so as to face the four photosensitive drums 11Y, 11M, 11C, and 11K. The intermediate transfer belt 31 serves as the second image bearing member that bears a toner image. The intermediate transfer belt 31 is entrained around a plurality of tension rollers (support rollers), that is, a driving roller 33, a tension roller 34, a pre-secondary transfer roller 35, and a secondary transfer inner roller 32 with predetermined tension (a tensile force) applied. The driving roller 33 transmits a driving force to the intermediate transfer belt 31. The driving roller 33 is rotationally driven by a driving force transmitted from a belt driving motor (not illustrated) serving as a driving source. As a result, a driving force is input to the intermediate transfer belt 31 from the driving roller 33 and, thus, the intermediate transfer belt 31 rotates (moves around) in the direction of arrow R2 (the clockwise direction) in FIG. 1 at a circumferential speed (a process speed) corresponding to the circumferential speed of the photosensitive drum 11. The tension roller 34 applies a predetermined tension to the intermediate transfer belt 31 and controls the tension of the intermediate transfer belt 31 to be constant. Both ends of the tension roller 34 in the rotational axis direction are urged by tension springs 36 in the direction from the inner circumferential surface to the outer circumferential surface of the intermediate transfer belt 31. The tension springs 36 consist of compression coil springs which are urging members serving as a tension applying unit (an urging unit). The pre-secondary transfer roller 35 forms a surface of the intermediate transfer belt 31 in the upstream vicinity of a secondary transfer unit N2 (described below) in the rotation direction of the intermediate transfer belt 31 (the movement direction of the surface). According to the present embodiment, the secondary transfer inner roller (the secondary transfer inner member) 32 functions as a secondary transfer member serving as the secondary transfer unit. The primary transfer rollers 15Y, 15M, 15C, and 15K, which are roller-shaped primary transfer members serving as primary transfer units, are disposed adjacent to the inner circumferential surface of the intermediate transfer belt 31 so as to correspond to the photosensitive drums 11Y, 11M, 11C, and 11K, respectively. According to the present embodiment, the primary transfer roller 15 is disposed at a location facing the photosensitive drum 11 via the intermediate transfer belt 31. The primary transfer roller 15 urges the intermediate transfer belt 31 toward the photosensitive drum 11 to form a primary transfer unit (a primary transfer nip) N1, which is a contact portion between the photosensitive drum 11 and the intermediate transfer belt 31. The tension rollers other than the driving roller 33 and the primary transfer rollers 15 are driven to rotate as the intermediate transfer belt 31 rotates. A pressing member 70 is provided adjacent to the inner circumferential surface of the intermediate transfer belt 31, upstream of the secondary transfer inner roller 32, and downstream of the pre-secondary transfer roller 35 in the rotation direction of the intermediate transfer belt 31. The image forming apparatus 100 further includes a moving mechanism 81 (FIG. 7) for changing the position of the pressing member 70. The pressing member 70 and the moving mechanism 81 are described in detail below.

As described above, the toner image formed on the photosensitive drum 11 is primary transferred onto the rotating intermediate transfer belt 31 in the primary transfer unit N1. During the primary transfer, a primary transfer power supply (not illustrated) applies, to the primary transfer roller 15, a primary transfer voltage (a primary transfer bias) that is a DC voltage of a polarity (a positive polarity according to the present embodiment) opposite to the normal charge polarity of the toner. For example, when a full-color image is formed, the toner images of yellow, magenta, cyan, and black colors formed on the respective photosensitive drums 11 are sequentially primarily transferred onto the same image forming region of the intermediate transfer belt 31 in a superimposed manner. According to the present embodiment, the primary transfer unit N1 defines an image formation position where the toner image is formed on the intermediate transfer belt 31. The intermediate transfer belt 31 is an example of a rotatable, seamless belt that conveys a toner image born at the image formation position.

A secondary transfer outer roller (a secondary transfer outer member) 41 is disposed adjacent to the outer circumferential surface of the intermediate transfer belt 31 at a position facing the secondary transfer inner roller 32. According to the present embodiment, the secondary transfer outer roller 41 functions as a counter member (a counter electrode) of the secondary transfer inner roller 32. The secondary transfer outer roller 41 is pressed toward the secondary transfer inner roller 32 via the intermediate transfer belt 31 and forms the secondary transfer unit (the secondary transfer nip) N2, which is a contact portion between the intermediate transfer belt 31 and the secondary transfer outer roller 41. As described above, in the secondary transfer unit N2, the toner image formed on the intermediate transfer belt 31 is secondarily transferred onto a recording medium P that is being nipped and conveyed by the intermediate transfer belt 31 and the secondary transfer outer roller 41. According to the present embodiment, during the secondary transfer, a secondary transfer voltage (a secondary transfer bias), which is a DC voltage of a polarity the same as the normal charge polarity of the toner (negative polarity according to the present embodiment), is applied to the secondary transfer inner roller 32 by a secondary transfer power supply (not illustrated). According to the present embodiment, the secondary transfer outer roller 41 is electrically grounded (connected to ground). The secondary transfer outer roller 41 may be used as the secondary transfer member, a secondary transfer voltage of a polarity opposite to the normal charge polarity of the toner may be applied to the secondary transfer outer roller 41, and the secondary transfer inner roller 32 may be used as the counter electrode that is electrically grounded.

The recording medium P is stored in recording medium cassettes 61*a* to 61*c* serving as recording medium storage units.

Each of the recording media P stored in the recording medium cassettes 61*a* to 61*c* is fed into a feeding and conveying path 63 by rotation drive of a corresponding one of feeding rollers 62*a* to 62*c*, which are feeding members serving as feeding units. The recording medium P is conveyed to a registration roller pair 21, which is the conveying member serving as a conveying unit, by a conveying roller pair 64, which is the conveying member serving as the conveying unit, and is stopped temporarily. The recording medium P is delivered to the secondary transfer unit N2 by the registration roller pair 21 that is driven to rotate in synchronization with the toner image formed on the intermediate transfer belt 31.

A conveyance guide (a pre-transfer guide) 22 is provided downstream of the registration roller pair 21 and upstream of the secondary transfer unit N2 in the conveyance direction of the recording medium P. The conveyance guide 22 guides the recording medium P to the secondary transfer unit N2. The conveyance guide 22 includes a first guide member 22*a* that can contact a front surface of the recording medium P (a surface onto which the toner image is transferred immediately after the recording medium P passes through the conveyance guide 22) and a second guide member 22*b* that can contact a back surface of the recording medium P (the surface opposite the front surface). The first guide member 22*a* and the second guide member 22*b* are disposed facing each other, and the recording medium P passes between the two guide members. The first guide member 22*a* regulates the movement of the recording medium P in a direction closer to the intermediate transfer belt 31, while the second guide member 22*b* regulates the movement of the recording medium P in a direction away from the intermediate transfer belt 31.

The recording medium P having the toner image thereon is conveyed to a fixing device 50 serving as a fixing unit by a conveyance belt (a pre-fixing conveyance device) 23 and the like. The fixing device 50 nips the recording medium P having an unfixed toner image thereon by using a fixing rotating member pair and conveys the recording medium P. At this time, the fixing device 50 applies heat and pressure to the recording medium P to fix (melt and stick) the toner image to the front surface of the recording medium P. The recording medium P having the fixed toner image thereon passes through a discharge conveying path 65 and is discharged (output) to a discharge tray 66 provided outside a main body 110 of the image forming apparatus 100.

A residual adhering substance, such as residual toner, on the photosensitive drum 11 after the primary transfer (primary transfer residual toner) is removed and collected from the photosensitive drum 11 by the cleaning device 16 serving as a cleaning unit. In addition, the residual adhering substance, such as residual toner, on the intermediate transfer belt 31 after the secondary transfer (secondary transfer residual toner) is removed and collected from the intermediate transfer belt 31 by a belt cleaning device 37 serving as an intermediate transfer member cleaning unit.

According to the present embodiment, an intermediate transfer belt unit 30 serving as a belt conveying device includes the intermediate transfer belt 31, the tension rollers 32 to 35, the primary transfer roller 15, the belt cleaning device 37, and a frame (not illustrated) that supports these elements. According to the present embodiment, the intermediate transfer belt unit 30 further includes the pressing member 70 and the moving mechanism 81 (described below). The intermediate transfer belt unit 30 is removable (or withdrawable) from the main body 110 of the image forming apparatus 100 for maintenance or replacement.

The intermediate transfer belt 31 can be made to have a single or multilayer structure of a resin-based material or a multilayer structure of a resin material layer and an elastic material layer. According to the present embodiment, the secondary transfer inner roller 32 is formed by providing an elastic electronically conductive rubber layer on the outer circumference of a metal core (a core material). According to the present embodiment, the pre-secondary transfer roller 35 is a metal roller. According to the present embodiment, the secondary transfer outer roller 41 is formed by providing an elastic ion-conductive foam rubber layer on the outer circumference of a metal core (a core material). According to the present embodiment, bearing members (not illustrated) that support both ends of the secondary transfer outer roller 41 in the rotational axis direction are slidable in a direction toward the secondary transfer inner roller 32 and in the opposite direction. The bearing members are pressed toward the secondary transfer inner roller 32 by a pressure spring 42 (FIGS. 2A to 2C) consisting of a compression coil spring, which is an urging member (an elastic member) serving as an urging unit. Thus, the secondary transfer outer roller 41 abuts against the secondary transfer inner roller 32 with a predetermined pressure with the intermediate transfer belt 31 therebetween. Thus, the secondary transfer unit N2 is formed. The rotational axis directions of the tension rollers for the intermediate transfer belt 31 including the secondary transfer inner roller 32 and the rotational axis direction of the secondary transfer outer roller 41 are substantially parallel to one another.

2. Secondary Transfer Unit

Figure 2A:
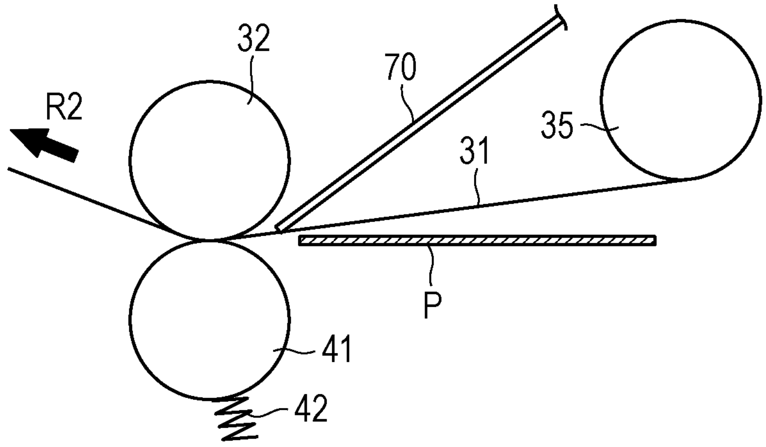
FIGS. 2A to 2C are schematic cross-sectional views of a secondary transfer unit and its vicinity.
Figure 2B:
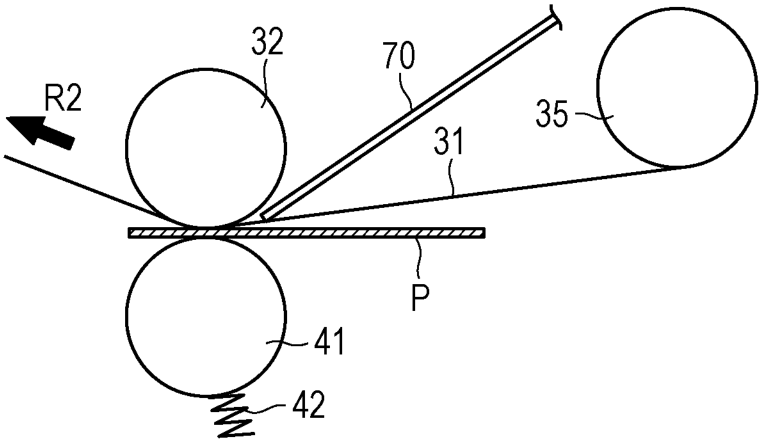
Figure 2C:
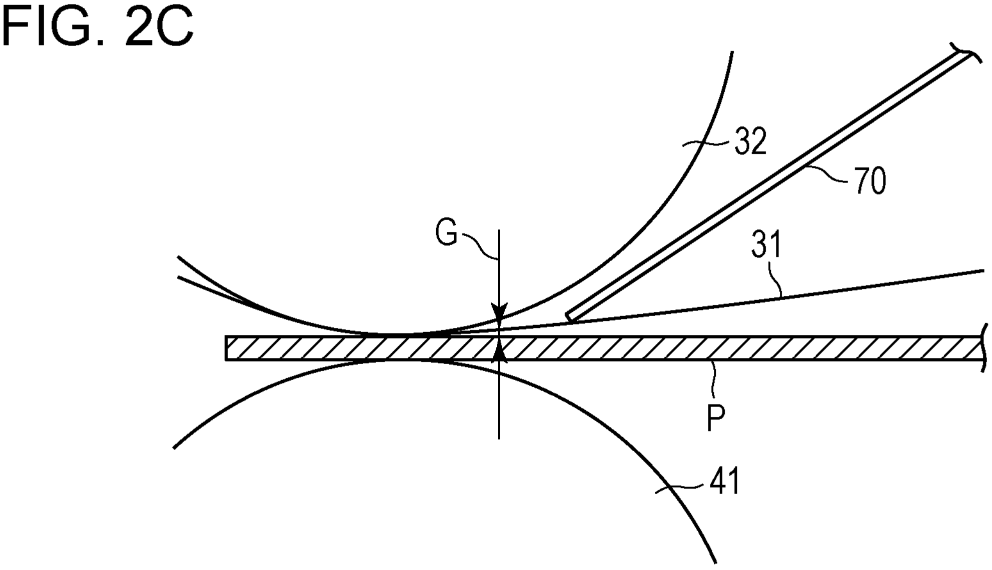

FIGS. 2A to 2C are schematic cross-sectional views of the image forming apparatus 100 (a cross section substantially orthogonal to the rotational axis direction of the secondary transfer inner roller 32) and illustrate the shape (the posture) of the intermediate transfer belt 31 upstream of the secondary transfer unit N2 according to the present embodiment. FIG. 2A illustrates the intermediate transfer belt 31 before the recording medium P moves to the secondary transfer unit N2, FIG. 2B illustrates the intermediate transfer belt 31 after the recording medium P moves into the secondary transfer unit N2, and FIG. 2C is an enlarged view of the secondary transfer unit N2 and its vicinity illustrated in FIG. 2B.

As illustrated in FIGS. 2A to 2C, according to the present embodiment, the intermediate transfer belt 31 has a shape formed when being tensioned between the secondary transfer inner roller 32 and the pre-secondary transfer roller 35. At this time, the secondary transfer outer roller 41 is elastically urged toward the secondary transfer inner roller 32 by the pressure spring 42. As a result, the intermediate transfer belt 31 is nipped between the secondary transfer inner roller 32 and the secondary transfer outer roller 41, and the secondary transfer unit N2 is formed.

According to the present embodiment, the pressing member 70 is provided upstream of the secondary transfer unit N2 so as to be in close proximity to the secondary transfer inner roller 32. According to the present embodiment, during image formation (during secondary transfer), the inner circumferential surface of the intermediate transfer belt 31 is in contact with the front end portion of the pressing member 70. The pressing member 70 can contact the inner circumferential surface of the intermediate transfer belt 31 and press the intermediate transfer belt 31 in a direction from the inner circumferential surface to the outer circumferential surface. As a result, the pressing member 70 can cause the tension surface of the intermediate transfer belt 31 formed between the secondary transfer inner roller 32 and the pre-secondary transfer roller 35 to stretch in the direction from the inner circumferential surface to the outer circumferential surface of intermediate transfer belt 31. According to the present embodiment, the pressing member 70 is formed as a flexible resin plate member, and the pressing member 70 uses its deflection elasticity to elastically press the intermediate transfer belt 31. Therefore, the shape (the amount of deflection, the amount of deformation) or the position of the pressing member 70 is determined to be a shape (or a position) that balances the urging force exerted on the intermediate transfer belt 31 by the pressing member 70 and the reaction force generated by the tensile force of the intermediate transfer belt 31. As used herein, the shape (or position) of the pressing member 70 determined in this manner is also referred to as a "statically determinate shape (or statically determinate position)". The shape (or posture) of the intermediate transfer belt 31 upstream of the secondary transfer unit N2 is formed by the statically determinate shape (or the statically determinate position) of the pressing member 70.

According to the present embodiment, the image forming apparatus 100 is configured such that the position of the pressing member 70 can be changed by the operation performed by the moving mechanism 81 (described below). As a result, according to the present embodiment, the image forming apparatus 100 is configured to be able to control the statically determinate shape (the statically determinate position) of the pressing member 70, that is, the shape (the posture) of the intermediate transfer belt 31 upstream of the secondary transfer unit N2.

According to the present embodiment, a bias of a polarity the same as the charge polarity of the toner that forms the toner image on the intermediate transfer belt 31 is applied to the secondary transfer inner roller 32, and the secondary transfer outer roller 41 is connected to ground. As a result, a transfer electric field is formed in the secondary transfer unit N2. The recording medium P is delivered to the secondary transfer unit N2 where the transfer electric field is formed while being guided by the conveyance guide 22 (FIG. 1). As illustrated in FIG. 2A, the recording medium P is conveyed toward the secondary transfer unit N2 with its leading edge abutting against the intermediate transfer belt 31 upstream of the secondary transfer unit N2 and also with its leading edge in contact with the toner image formed on the surface of the intermediate transfer belt 31. As illustrated in FIG. 2B, when the recording medium P is conveyed into the secondary transfer unit N2, the toner image is transferred from the intermediate transfer belt 31 to the recording medium P by the pressurizing action between the secondary transfer inner roller 32 and the secondary transfer outer roller 41 and the electrical action due to the transfer electric field.

As used herein, the term "contact length" refers to the length of contact between the intermediate transfer belt 31 and the recording medium P upstream of the secondary transfer unit N2 in the rotation direction of the intermediate transfer belt 31 when the recording medium P is conveyed to the secondary transfer unit N2. For highly accurate secondary transfer, the contact length is important.

If the contact length is large, image defects may occur due to frictional sliding between the toner image formed on the intermediate transfer belt 31 and the recording medium P. In contrast, if the contact length is small, an air gap (a gap) G (FIG. 2C) between the intermediate transfer belt 31 and the recording medium P increases and, thus, image defects may occur due to electrical discharge phenomena that occurs in the air gap G. Furthermore, when a recording medium P with high rigidity, such as thick paper or coated paper, is used, the intermediate transfer belt 31 is easily deformed when the recording medium P enters the abutment position of the leading edge of the recording medium P against the intermediate transfer belt 31 upstream of the secondary transfer unit N2. As a result, the air gap G described above is highly likely to occur, and image defects due to electrical discharge in the air gap G may easily occur.

By providing the pressing member 70 as in the present embodiment, it becomes easier to set an appropriate contact length between the intermediate transfer belt 31 and the recording medium P upstream of the secondary transfer unit N2. In particular, according to the present embodiment, the shape (posture) of the intermediate transfer belt 31 upstream of the secondary transfer unit N2 can be controlled by variably controlling the position of the pressing member 70 using the moving mechanism 81 (described below). This enables stable secondary transfer of the toner image by optimizing the contact length between the intermediate transfer belt 31 and the recording medium P upstream of the secondary transfer unit N2. Furthermore, even when recording medium P with high rigidity, such as thick paper or coated paper, is used, deformation of the intermediate transfer belt 31 that occurs when the intermediate transfer belt 31 comes into contact with the recording medium P can be reduced by the effect of the elastic force of the pressing member 70. As a result, an increase in air gap G between the intermediate transfer belt 31 and the recording medium P can be reduced.

The image forming apparatus 100 according to the present embodiment is a high-productivity apparatus, and the intermediate transfer belt 31 runs at a speed of 400 mm/s. In the image forming apparatus 100 according to the present embodiment, the toner is charged to a negative polarity. In addition, in the image forming apparatus 100 according to the present embodiment, a high voltage bias of −10 kV is applied to the secondary transfer inner roller 32 as the secondary transfer voltage to ensure appropriate transfer performance even at the above-described conveyance speed of the intermediate transfer belt 31.

However, the values of the conveyance speed of the intermediate transfer belt 31, toner charge polarity, and secondary transfer voltage are not limited to the above-described values.

3. Pressing Member

According to the present embodiment, as described above, the image forming apparatus 100 includes the pressing member (the backup member, the backup sheet) 70 adjacent to the inner circumferential surface of the intermediate transfer belt 31 and in the upstream vicinity of the secondary transfer unit N2. The pressing member 70 can press the inner circumferential surface of the intermediate transfer belt 31 in the vicinity of the entrance of the secondary transfer unit N2 to stretch the intermediate transfer belt 31 toward the outer circumferential surface side. The pressing member 70 is disposed so as to be contactable with the inner circumferential surface of the intermediate transfer belt 31 upstream of the secondary transfer inner roller 32 and downstream of the pre-secondary transfer roller 35 in the rotation direction of the intermediate transfer belt 31. In particular, according to the present embodiment, the pressing member 70 is disposed so as to be contactable with the inner circumferential surface of the intermediate transfer belt 31 upstream of the secondary transfer inner roller 32 and downstream of the downstream end of the conveyance guide 22 (the first guide member 22*a*) in the conveyance direction of the recording medium P.

According to the present embodiment, the pressing member 70 is formed as a substantially rectangular plate-like (sheet-like) member in plan view. The pressing member 70 has a predetermined length in the longitudinal direction that is substantially parallel to the width direction of the intermediate transfer belt 31, a predetermined length in the lateral direction that is substantially orthogonal to the longitudinal direction, and a predetermined thickness. The width direction of the intermediate transfer belt 31 is substantially orthogonal to the movement direction of the surface of the intermediate transfer belt 31 and is substantially parallel to the rotational axis direction of the secondary transfer inner roller 32. The length of the pressing member 70 in the longitudinal direction is the same as the length of the intermediate transfer belt 31 in the width direction. A free end portion (a front end portion) of the pressing member 70, which is one end portion in the lateral direction (the downstream end portion in the rotation direction of the intermediate transfer belt 31) can be in contact with the inner circumferential surface of the intermediate transfer belt 31 over the substantially entire width of the intermediate transfer belt 31 and can press the intermediate transfer belt 31. Part of a fixed end portion (a base end portion), which is the other end portion of the pressing member 70 in the lateral direction (an upstream end in the rotation direction of the intermediate transfer belt 31), is fixed to a holding device 82 (a holding mechanism, FIG. 7) that constitutes the moving mechanism 81 (described below), so that the pressing member 70 is held by the holding device 82.

According to the present embodiment, the pressing member 70 is made of a resin material. In particular, according to the present embodiment, the pressing member 70 is made of polyphenylene sulfide (PPS) having a thickness of 0.5 mm, and the pressing member 70 uses the deflection elasticity to elastically press the intermediate transfer belt 31. The configuration of the pressing member 70 is not limited to the configuration of the present embodiment. Any member that elastically presses the intermediate transfer belt 31 can be employed. For example, the thickness of the pressing member 70 is not limited to 0.5 mm and, preferably, 0.4 to 1.5 mm. For example, the thickness may be 1.0 mm. The material of the pressing member 70 is not limited to PPS. For example, the material may be polyetheretherketone (PEEK) or polyethylene terephthalate (PET).

It is desirable that the pressing member 70 and, more precisely, the free end portion (the front end portion) in the lateral direction of the pressing member 70 (hereinafter also simply referred to as a "front end") is disposed as close as possible to the secondary transfer inner roller 32. However, the pressing member 70 is disposed so as not to be in contact with the secondary transfer inner roller 32. For example, the pressing member 70 is disposed so as to be in contact with the inner circumferential surface of the intermediate transfer belt 31 at a distance of about 2 mm or more, typically about 10 mm or more, from the position where the secondary transfer inner roller 32 is in contact with the intermediate transfer belt 31 upstream in the rotation direction of the intermediate transfer belt 31. In addition, for example, the pressing member 70 is disposed so as to be in contact with the inner circumferential surface of the intermediate transfer belt 31 at a distance of about 40 mm or less, typically about 25 mm or less, from the position where the secondary transfer inner roller 32 is in contact with the intermediate transfer belt 31 upstream in the rotation direction of the intermediate transfer belt 31.

4. Basic Configuration and Operation of Moving Mechanism

Figure 3:
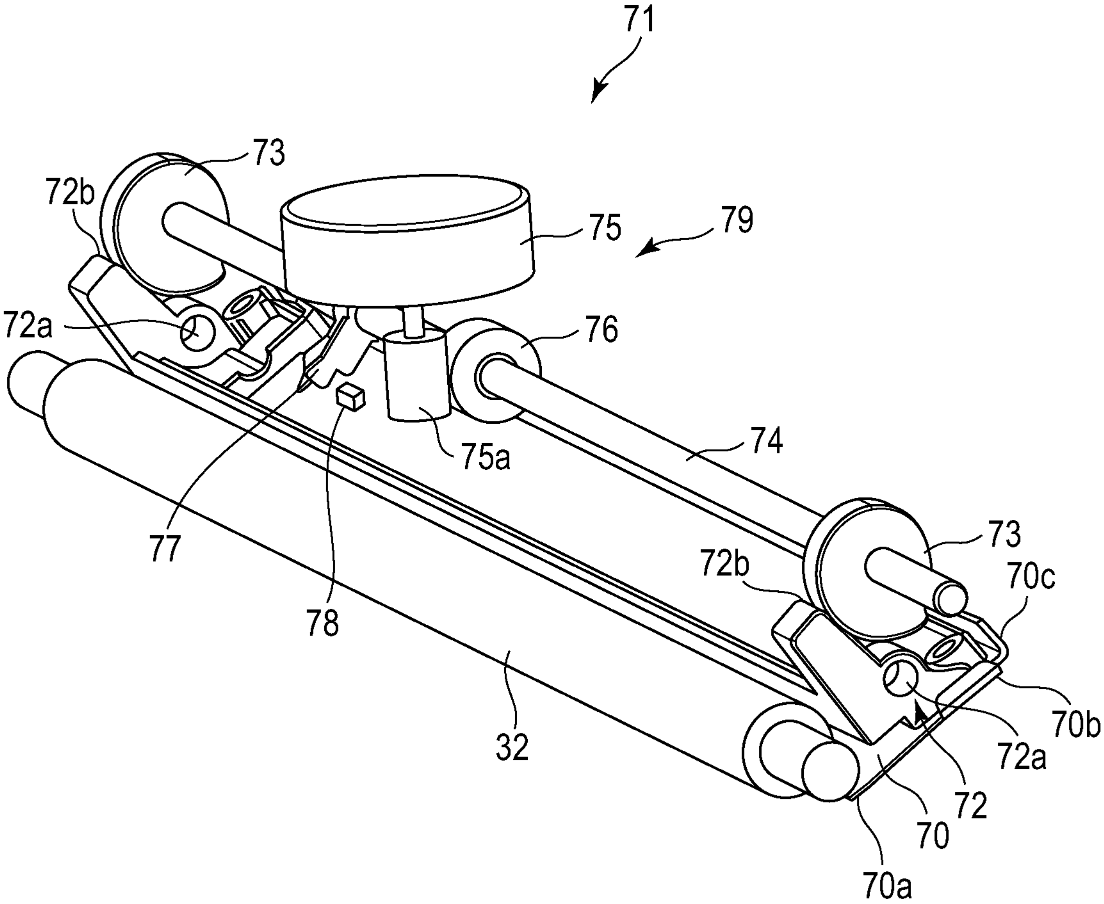
FIG. 3 is a schematic perspective view of the basic structure of a moving mechanism.
Figure 4A:
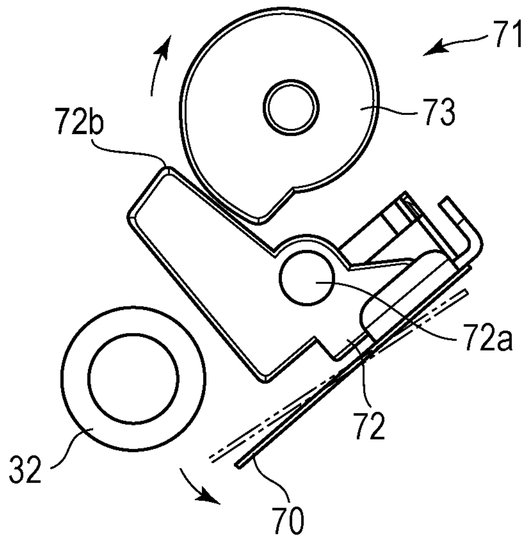
FIGS. 4A and 4B are schematic side views of the basic structure of the moving mechanism.
Figure 4B:
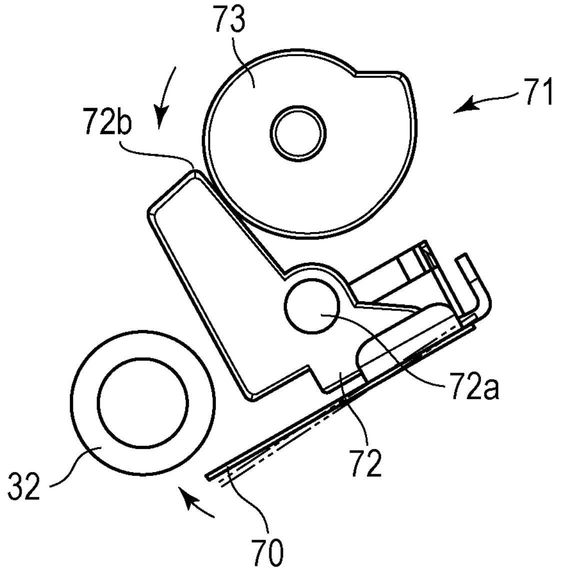

The moving mechanism for changing the position of the pressing member 70 is described below. For ease of understanding the issues and solutions of the disclosure, the basic configuration and operation of the moving mechanism are first described with reference to the configuration of an example of an existing moving mechanism. FIG. 3 is a perspective view of an existing moving mechanism 71. FIGS. 4A and 4B illustrate the operation performed by the moving mechanism 71, and FIGS. 4A and 4B are schematic side views of the pressing member 70 and its vicinity as viewed from one end portion side in the rotational axis direction of the secondary transfer inner roller 32 (in the direction into the plane of FIG. 1) in a direction substantially parallel to the rotational axis direction. For description purpose, in FIGS. 4A and 4B, the intermediate transfer belt 31 is removed, and the existing moving mechanism 71 is incorporated into the image forming apparatus 100 according to the present embodiment.

By changing the position of the pressing member 70, the moving mechanism 71 can control the statically determinate shape (the statically determinate position) of the pressing member 70, that is, the shape (posture) of the intermediate transfer belt 31 upstream of the secondary transfer unit N2. This enables the moving mechanism 71 to optimize the contact length between the intermediate transfer belt 31 and the recording medium P upstream of the secondary transfer unit N2. In other words, by changing the position of the pressing member 70, the moving mechanism 71 can control the amount of pressure (the inroad amount (described below)) of the pressing member 70 on the intermediate transfer belt 31. In addition, by changing the position of the pressing member 70, the moving mechanism 71 can change whether the pressing member 70 is in contact with or is separated from the intermediate transfer belt 31.

The moving mechanism 71 includes a holding device (a holding member) 72 extending in the width direction of the intermediate transfer belt 31. The pressing member 70 is held by the holding device 72. The free end portion (the front end portion in the lateral direction) 70*a* of the pressing member 70 can be in contact with the inner circumferential surface of the intermediate transfer belt 31 over the substantially entire width of the intermediate transfer belt 31 and can press the intermediate transfer belt 31.

In addition, in the present example, part of the pressing member 70 adjacent to the fixed end portion (the base end portion) 70*b* in the lateral direction is fixed to an attachment tool 70*c*. The attachment tool 70*c* consists of a sheet metal having a plate portion extending in the width direction of the intermediate transfer belt 31 (the longitudinal direction of the pressing member 70) and is used to attach the pressing member 70 to the holding device 72. Part of the pressing member 70 adjacent to the fixed end portion 70*b* in the lateral direction is fixed to the attachment tool 70*c* by, for example, adhesion over its substantially entire width in the longitudinal direction, and the attachment tool 70*c* is fixed to the holding device 72 by, for example, a screw. Both end portions of the holding device 72 in the longitudinal direction have circular support holes 72*a*. The holding device 72 is supported by a frame or the like (not illustrated) of the intermediate transfer belt unit 30 so as to be rotatable about the support holes 72*a* and about a pivotal axis that is substantially parallel to the width direction of the intermediate transfer belt 31. By rotating the holding device 72 about the pivotal axis that is substantially parallel to the width direction of the intermediate transfer belt 31, the pressing member 70 is rotated about the pivotal axis. As a result, the position of the pressing member 70 can be changed.

The moving mechanism 71 further includes a cam shaft 74 formed as a columnar member extending in the width direction of the intermediate transfer belt 31. The cam shaft 74 is supported by a frame or the like (not illustrated) of the intermediate transfer belt unit 30 in a rotatable manner about the rotational axis that is substantially parallel to the width direction of the intermediate transfer belt 31. The moving mechanism 71 further includes a cam 73, a transfer gear 76, and a flag (a cam position flag) 77. The cam 73, the transfer gear 76, and the flag 77 are fixed to the cam shaft 74. The cam 73 is provided at each of both end portions in the rotational axis direction of the cam shaft 74 (two in total). The moving mechanism 71 further includes, as a drive source, a cam drive motor 75 that is a stepping motor. The cam drive motor 75 is fixed to the frame or the like (not illustrated) of the intermediate transfer belt unit 30 such that a drive gear 75*a* fixed to the output shaft of the cam drive motor 75 meshes with the transfer gear 76 fixed to the cam shaft 74. When the cam drive motor 75 rotates, a driving force is transmitted to the cam shaft 74 via the transfer gear 76, and the cam 73, transfer gear 76, and flag 77 rotate integrally with the cam shaft 74 about the rotational axis that is substantially parallel to the width direction of the intermediate transfer belt 31.

The cam 73 serving as an abutting portion abuts against a cam follower 72*b* serving as an abutted portion provided in the holding device 72. The cam 73 forms a stepless surface whose radius from the center of rotation varies uniformly in accordance with the angle of rotation. Therefore, when the cam 73 is rotated by rotation of the cam drive motor 75, the holding device 72 rotates about the support hole 72*a*. As a result, the moving mechanism 71 can move the pressing member 70 to change the position of the pressing member 70.

As used herein, the term "changing the position of the pressing member 70" more precisely refers to changing the position of the front end of the pressing member 70 (hereinafter simply referred to as a "front end position") on the assumption that the intermediate transfer belt 31 is not present. In the present example, the term "changing the position of the pressing member 70" more specifically refers to changing the position of the movable holding device 72 included in the moving mechanism 71.

The moving mechanism 71 further includes a position sensor (a cam position sensor, a cam HP sensor) 78 serving as a position detecting unit to detect the position of the cam 73 in the rotation direction and, in particular, the home position (HP) in the rotation direction in the present example. The position sensor 78 is supported by the frame or the like (not illustrated) of the intermediate transfer belt unit 30. The position sensor 78 and the flag 77 serving as an indicating unit (an indicating portion) fixed to the above-described cam shaft 74 constitute an optical position detection mechanism. The posture of the moving mechanism 71 can be set to a predetermined neutral posture by the operation performed by the position sensor 78 and the flag 77.

As illustrated in FIG. 4A, when moving the pressing member 70 in the direction of pressing the intermediate transfer belt 31, the cam 73 is driven by the cam drive motor 75 to rotate clockwise. This causes the holding device 72 to rotate counterclockwise about the support hole 72*a*, and the position of the pressing member 70 (more precisely, the front end position) moves toward the outer circumferential surface of the intermediate transfer belt 31. As illustrated in FIG. 4B, when moving the pressing member 70 in the direction opposite to the above-described direction, that is, the direction away from the intermediate transfer belt 31, the cam 73 is driven by the cam drive motor 75 to rotate counterclockwise. This causes the holding device 72 to rotate clockwise about the support hole 72*a*, and the position of the pressing member 70 (more precisely, the front end position) moves toward the inner circumferential surface of the intermediate transfer belt 31.

The holding device 72 is urged so that the cam follower 72*b* rotates in the direction in which the cam follower 72*b* is engaged with the cam 73. The holding device 72 may be urged by the tension of the intermediate transfer belt 31 via the pressing member 70. In addition, the holding device 72 may include a spring or the like which is an urging member serving as an urging unit that urges the holding device 72. This enables the pressing member 70 to be separated from the intermediate transfer belt 31.

In the present example, the cam 73, cam shaft 74, cam drive motor 75, and transfer gear 76 constitute a moving device 79 that moves the holding device 72, and the moving mechanism 71 is constituted by the moving device 79 and the holding device 72.

Figure 5:
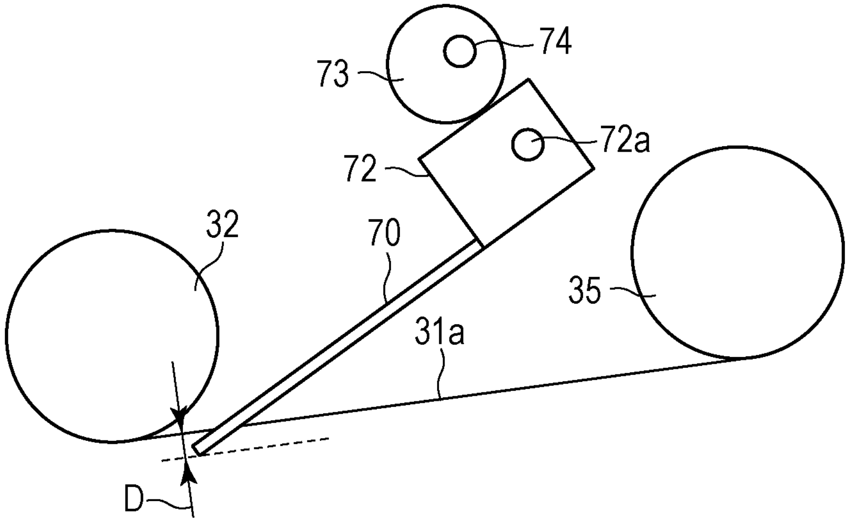
FIG. 5 is a schematic cross-sectional view illustrating the inroad amount of a pressing member.

FIG. 5 is a schematic cross-sectional view (a cross-sectional view substantially orthogonal to the rotational axis direction of the secondary transfer inner roller 32) illustrating the inroad amount of the pressing member 70 into the intermediate transfer belt 31. The amount of pressure of the pressing member 70 against the intermediate transfer belt 31 can be expressed by the inroad amount of the pressing member 70 into the intermediate transfer belt 31. The inroad amount of the pressing member 70 is roughly the amount by which the pressing member 70 stretches the tensioned surface of the intermediate transfer belt 31 outward when the surface is tensioned by the secondary transfer inner roller 32 and the pre-secondary transfer roller 35. The pre-secondary transfer roller 35 is an example of one of the upstream rollers among the tension rollers disposed upstream of the secondary transfer inner roller 32 in the rotation direction of the intermediate transfer belt 31 and adjacent to the secondary transfer inner roller 32. That is, in the cross section illustrated in FIG. 5, let a common tangent line 31*a* be the common tangent line extending between the secondary transfer inner roller 32 and the pre-secondary transfer roller 35 that are in contact with the intermediate transfer belt 31. Then, the inroad amount D of the pressing member 70 can be defined as the normal distance from the common tangent line 31*a* to the front end of the pressing member 70 when the intermediate transfer belt 31 is not mounted (the distance between the common tangent line 31*a* and a line that passes through the front end of the pressing member 70 parallel to the common tangent line 31*a*).

Figure 6:
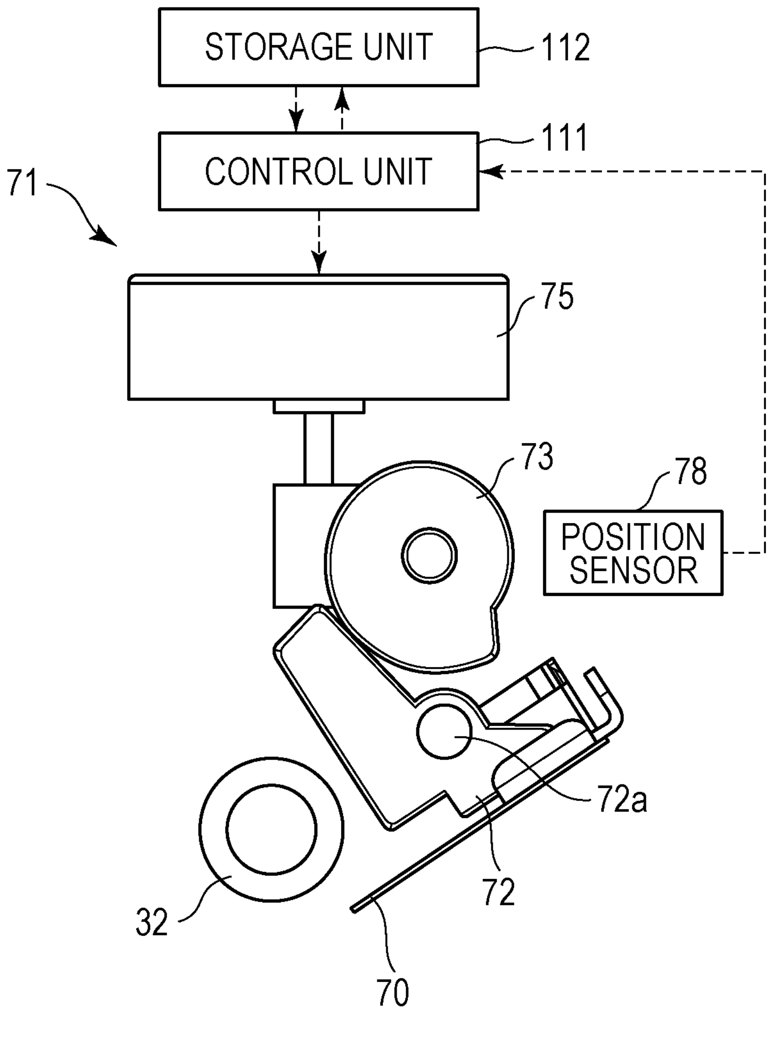
FIG. 6 is a schematic block diagram illustrating the control mode of the moving mechanism.

FIG. 6 is a schematic block diagram of an example of how to control the setting (adjusting) of the position of the pressing member 70. The image forming apparatus 100 includes a storage unit 112 and a control unit 111. The control unit 111 can control the position (more precisely, the front end position) of the pressing member 70 by controlling the rotation angle of the cam 73 and, thus, controlling the position of the support member 72 in the rotary direction of the support member 72. That is, the control unit 111 can detect the neutral state (the home position of the cam 73) of the moving mechanism 71 on the basis of a signal (information) received from the position sensor 78. In addition, the control unit 111 can pulse-control the cam drive motor 75. Then, the control unit 111 can input a desired number of pulses to the cam drive motor 75 in the neutral state and move the support member 72 to a desired position. Thus, the control unit 111 can move the pressing member 70 to a desired position. For example, the relationship between the inroad amount D of the pressing member 70 and the number of pulses input to the cam drive motor 75 can be stored in the storage unit 112 in advance. This enables the control unit 111 to variably control the inroad amount D of the pressing member 70 by inputting a desired number of pulses to the cam drive motor 75.

Although not limited to following, an inroad amount D of the pressing member 70 of 1.0 mm to 3.5 mm or less is suitable. These values stabilize the shape of the intermediate transfer belt 31 upstream of the secondary transfer unit N2 and reduce the probability that smooth rotation of the intermediate transfer belt 31 is disabled by an excessive increase in the load applied to the contact surface between the pressing member 70 and the intermediate transfer belt 31. It is required that the inroad amount D of the pressing member 70 be the desired amount when the recording medium P passes through the vicinity of the entrance of the secondary transfer unit N2 and the secondary transfer unit N2. More precisely, the vicinity of the entrance of the secondary transfer unit N2 is a region corresponding to the region of the intermediate transfer belt 31 between the position at which the pressing member 70 is brought into contact with the intermediate transfer belt 31 and the secondary transfer unit N2 in the conveyance direction of the recording medium P. For example, in a standby state (the state in which the image forming apparatus 100 is standby for input of a job with the power ON), a power-OFF state, or a sleep state of the image forming apparatus 100, the pressing member 70 can be positioned away from (or in slight contact with) the intermediate transfer belt 31. For example, the neutral state of the moving mechanism 71 may be defined as a state in which the pressing member 70 is separated from the intermediate transfer belt 31.

5. Issues

For example, the existing moving mechanism 71 described above includes the cam 73 serving as the abutting portion at each of two locations in the width direction of the intermediate transfer belt 31 (the longitudinal direction of the pressing member 70), that is, one at the front side and the other at the rear side.

Then, each of the cams 73 is in contact with the cam follower 72*b* serving as the abutted portion of the holding device 72. At this time, because the distance between the two cam followers 72*b* at the front and rear sides is relatively large, a difference in distance of the cam follower 72*b* to the rotational axis of the cam 73 may occur between the front and rear sides due to the part accuracy of the holding device 72 regarding the shape of the contact portion with the cam 73 and the like. In this case, the final front end position of the pressing member 70 relative to the intermediate transfer belt 31 and the final amount of pressure (the inroad amount) on the intermediate transfer belt 31 may differ between the front side and the rear side.

As a result, it may be difficult to make the contact distance between the intermediate transfer belt 31 and the recording medium P uniform in the width direction of the intermediate transfer belt 31 (the longitudinal direction of the pressing member). Then, for example, on either the front or rear side of the intermediate transfer belt 31 in the width direction (the longitudinal direction of the pressing member 70), image defects may occur due to electrical discharge caused by air gap or frictional sliding caused by the long contact distance.

Therefore, according to the present embodiment, at least one of the at least two abutted portions of the holding device that is abutted by the abutting portion of the moving device that moves the holding device is provided in an adjusting member that is fixed to the holding device and that is configured to adjust the distance from the abutting portion. This can reduce the influence of the above-described difference in the distance between the abutted portion and the abutting portion on the front side and the rear side. The reason for providing the adjusting member is described in more detail below.

6. Moving Mechanism of Embodiment

Figure 7:
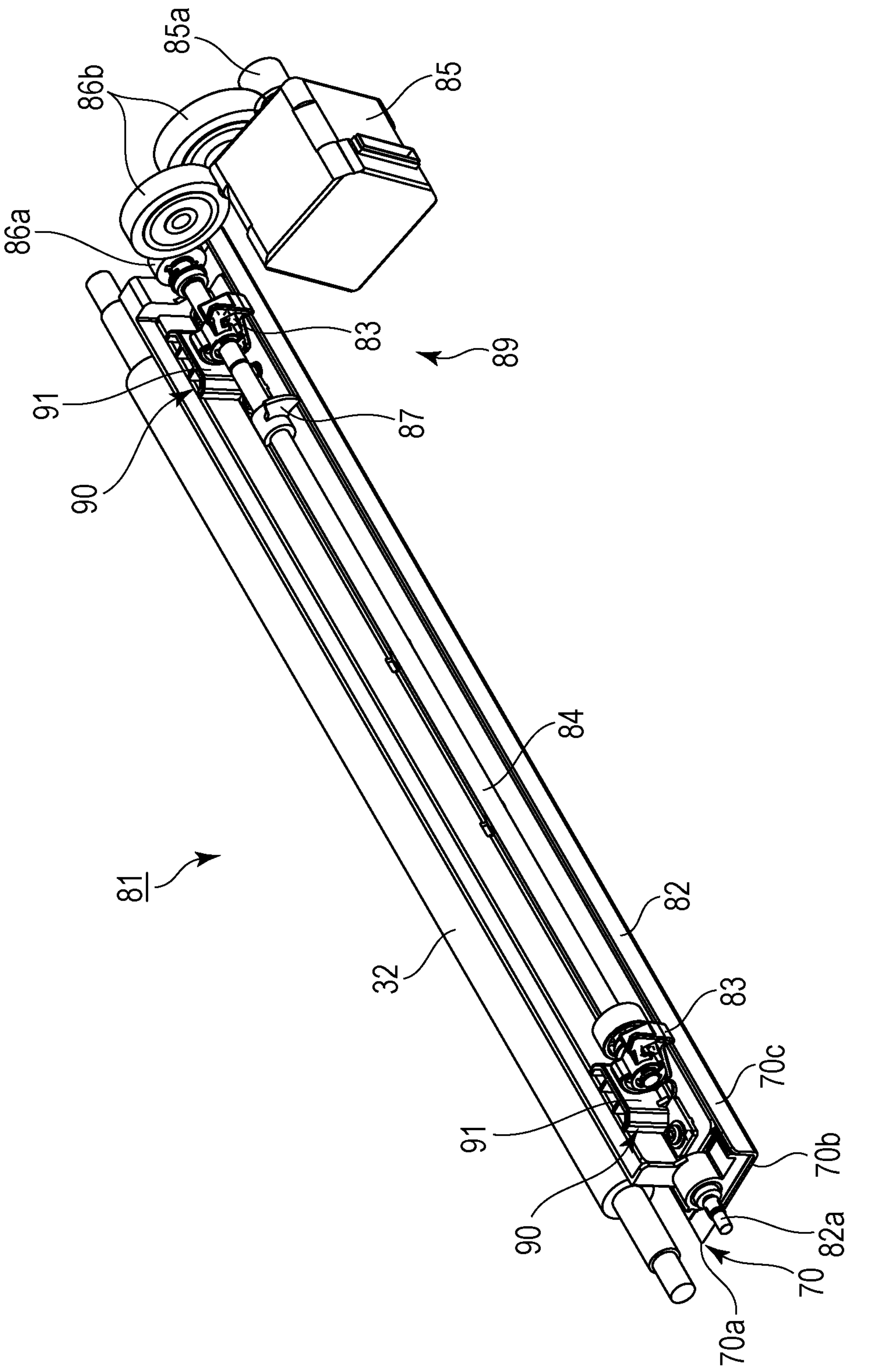
FIG. 7 is a schematic perspective view of the moving mechanism.

The moving mechanism 81 according to the present embodiment is described below. FIG. 7 is a perspective view of the moving mechanism 81 according to the present embodiment. The basic configuration and operation of the moving mechanism 81 according to the present embodiment are substantially the same as those of the existing moving mechanism 71 described above. In FIG. 7, the moving mechanism 81 according to the present embodiment is illustrated just like the above-described existing moving mechanism 71 illustrated as viewed from the side with the cam 73.

The moving mechanism 81 includes a holding device (a holding member) 82 extending in the width direction of the intermediate transfer belt 31. The pressing member 70 is held by the holding device 82. The free end portion (the front end portion) 70*a* of the pressing member 70 in the lateral direction can be in contact with the inner circumferential surface of the intermediate transfer belt 31 over the substantially entire width of the intermediate transfer belt 31 and can press the intermediate transfer belt 31.

According to the present embodiment, part of the pressing member 70 adjacent to the fixed end portion (the base end portion) 70*b* in the lateral direction is fixed to an attachment tool 70*c*. The attachment tool 70*c* is formed as a sheet metal having a plate portion extending in the width direction of the intermediate transfer belt 31 (the longitudinal direction of the pressing member 70) and is used to attach the pressing member 70 to the holding device 82. Part of the pressing member 70 adjacent to the fixed end portion 70*b* in the lateral direction is fixed to the attachment tool 70*c* by, for example, adhesion over its substantially entire width in the longitudinal direction, and the attachment tool 70*c* is fixed to the holding device 82 by a screw or the like.

The pressing member 70 may be directly fixed to the holding device 82. Both end portions of the holding device 82 in the longitudinal direction have rotating shafts 82*a*. The holding device 82 is supported by a frame or the like (not illustrated) of the intermediate transfer belt unit 30 via the rotating shafts 82*a* so as to be rotatable about the rotating shafts 82*a* and about a pivotal axis that is substantially parallel to the width direction of the intermediate transfer belt 31. By rotating the holding device 82 about the pivotal axis that is substantially parallel to the width direction of the intermediate transfer belt 31, the pressing member 70 is rotated about the pivotal axis. Thus, the position of the pressing member 70 can be changed.

The moving mechanism 81 includes a cam shaft 84 formed as a columnar member extending in the width direction of the intermediate transfer belt 31. The cam shaft 84 is supported by a frame or the like (not illustrated) of the intermediate transfer belt unit 30 in a rotatable manner about the rotational axis that is substantially parallel to the width direction of the intermediate transfer belt 31. The moving mechanism 81 further includes a cam 83, a drive gear 86*a*, and a flag (a cam position flag) 87. The cam 83, the drive gear 86*a*, and the flag 87 are fixed to the cam shaft 84. The cam 83 is provided at each of both end portions in the rotational axis direction of the cam shaft 84 (two in total). The drive gear 86*a* is provided at a rear end portion of the cam shaft 84 in the rotational axis direction. The moving mechanism 81 further includes a cam drive motor 85 that is a stepping motor and that serves as a drive source and a transfer gear train 86*b*. The cam drive motor 85 and the transfer gear train 86*b* are provided in the rear of the cam shaft 84 in the rotational axis direction.

The drive gear 86*a* fixed to the cam shaft 84 is drive-coupled with an output gear 85*a* fixed to the output shaft of the cam drive motor 85 via the transfer gear train 86*b*. The cam drive motor 85 and the transfer gear train 86*b* are supported by the frame or the like (not illustrated) of the intermediate transfer belt unit 30. When the cam drive motor 85 rotates, a driving force is transmitted to the cam shaft 84 via the transfer gear train 86*b* and the drive gear 86*a*, and the cam 73 and the flag 87 rotate integrally with the cam shaft 84 about the rotational axis that is substantially parallel to the width direction of the intermediate transfer belt 31.

The cam 83 serving as the abutting portion abuts against an abutted surface 91 serving as the abutted portion provided in a cam follower member 90 fixed to the holding device 82 and serving as an adjusting member. The cam follower member 90 is described in more detail below. The cam 73 forms a stepless surface whose radius from the center of rotation varies uniformly in accordance with its angle of rotation. The stepless surface abuts against the abutted surface 91 of the cam follower member 90. The cam follower member 90 is provided in each of both end portions of the holding device 82 in the longitudinal direction of the holding device 82 (two in total). Each of the cams 83 provided in both end portions of the cam shaft 84 in the rotational axis direction abuts against one of the cam follower members 90.

Therefore, when the cam 73 is rotated by rotation of the cam drive motor 85, the rotation of cam 73 causes the holding device 82 to rotate about the rotating shaft 82*a*. As a result, the moving mechanism 81 can move the pressing member 70 and change the position of the pressing member 70. As described above, the term "changing the position of the pressing member 70" more precisely refers to changing the position of the front end position of the pressing member 70 on the assumption that the intermediate transfer belt 31 is not present. According to the present embodiment, the term "changing the position of the pressing member 70" more specifically refers to changing the position of the movable holding device 82 included in the moving mechanism 81.

Like the existing moving mechanism 71 described above, the moving mechanism 81 includes a position sensor (not illustrated) supported by the frame or the like (not illustrated) of the intermediate transfer belt unit 30. In addition, like the above-described existing moving mechanism 71, the posture of the moving mechanism 81 can be set to a predetermined neutral posture by the operation performed by the position sensor and the flag 87. The operation performed by the moving mechanism 81 to change the position of the pressing member 70 is the same as that performed by the above-described existing moving mechanism 71 and, therefore, description of the operation is omitted.

According to the present embodiment, the cam 83, cam shaft 84, cam drive motor 85, drive gear 86*a*, transfer gear train 86*b*, and the like constitute the moving device 89 that moves the holding device 82. The moving mechanism 81 is then constituted by the moving device 89 and the holding device 82.

Here, the moving mechanism 81 according to the present embodiment has a configuration in which the cam follower member 90 configured as a separate member is fixed to the holding device 82, and the cam 83 abuts against the cam follower member 90. The cam follower member 90 can be fixed after the position of the cam follower member 90 is adjusted relative to the holding device 82.

Figure 8:
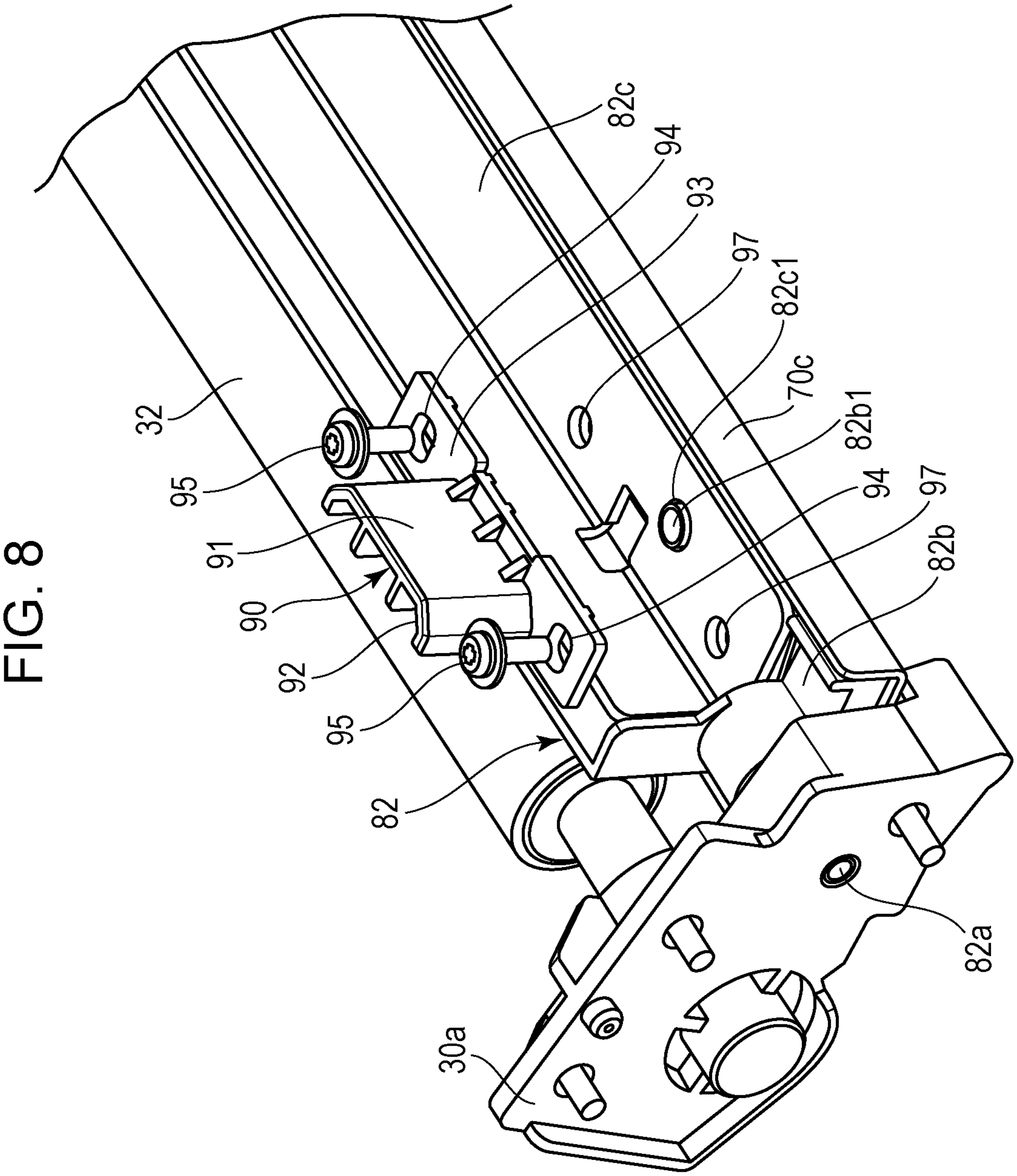
FIG. 8 is an exploded perspective view of a cam follower member mounting portion of a holding device and its vicinity.
Figure 9:
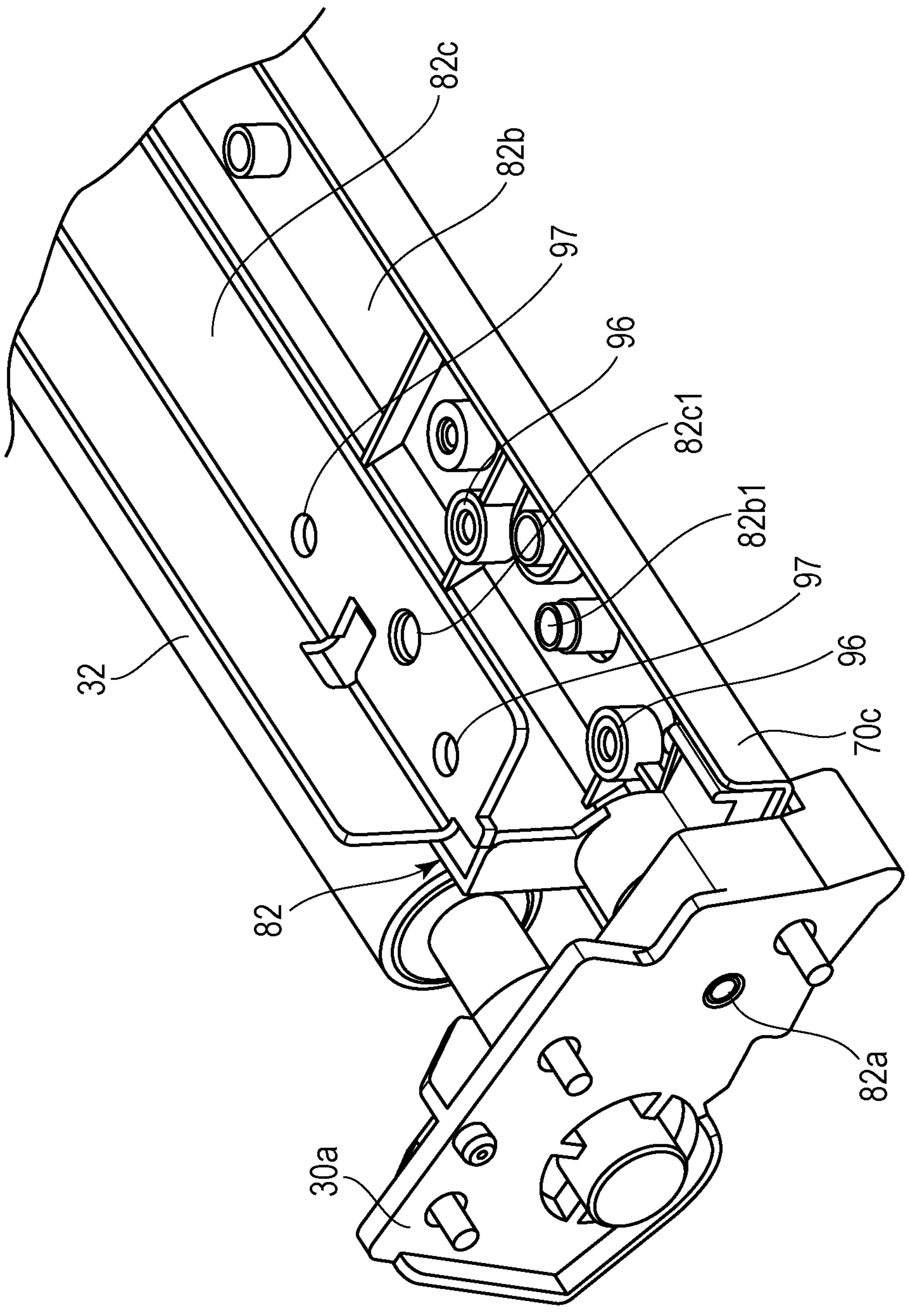
FIG. 9 is an exploded perspective view of the cam follower member mounting portion of the holding device and its vicinity.

FIGS. 8 and 9 are exploded perspective views of a front mounting portion of the holding device 82 on which the cam follower member 90 is mounted and its vicinity. In FIG. 8, the cam follower member 90 is removed from the holding device 82. In FIG. 9, a reinforcing metal plate 82*c* (described below) is further removed.

The holding device 82 includes a base member 82*b* extending in the width direction of the intermediate transfer belt 31. The base member 82*b* is made of a resin material and has the above-described rotating shaft 82*a* in each of both end portions thereof in the longitudinal direction. The base member 82*b* is rotatably supported by a frame 30*a* or the like of the intermediate transfer belt unit 30 via the rotating shafts 82*a*. The frame 30*a* may be a frame of a sub-unit including the pressing member 70 and a holding device 82 that are removable from the intermediate transfer belt unit 30. The pressing member 70 is fixed to the base member 82*b* via the above-described attachment tool 70*c* by a fixing unit, such as a screw. The attachment tool 70*c* is fixed to a lower side portion of the base member 82*b* in FIGS. 8 and 9, which is a side portion facing the intermediate transfer belt 31. In addition, the reinforcing metal plate 82*c* is fixed to the upper side portion of the base member 82*b* in FIGS. 8 and 9, which is opposite to the side to which the attachment tool 70*c* is fixed, by the fixing unit, such as a screw. The reinforcing metal plate 82*c* is formed as a sheet metal having a plate-like portion extending in the longitudinal direction of the base member 82*b*. According to the present embodiment, the reinforcing metal plate 82*c* is provided to reinforce the holding device 82. However, a configuration having no reinforcing metal plate 82*c* may be employed.

The cam follower member 90 is disposed in the vicinity of an end portion of the holding device 82 in the longitudinal direction so as to overlap, from above, the reinforcing metal plate 82*c* fixed to the base member 82*b* in FIG. 8. The cam follower member 90 is fixed to the base member 82*b* by a screw (a screw with collar) 95, which is a fixture (a fastener) serving as a fixing unit. That is, the cam follower member 90 includes a main portion 92 and a base portion 93. The main portion 92 has the abutted surface 91 serving as the abutted portion against which the cam 83 abuts as described above. The base portion 93 is used to fix the cam follower member 90 to the holding device 82.

The base portion 93 is formed along the surface of the reinforcing metal plate 82*c*, and the main portion 92 is formed to stand in a direction intersecting the surface of the base portion 93. The base portion 93 has, formed therein, an adjustment hole 94 formed as a slotted hole elongated in a direction that intersects (is substantially orthogonal to, according to the present embodiment) the rotational axis direction of the cam shaft 84 (the longitudinal direction of the holding device 82, the width direction of the intermediate transfer belt 31). The base member 82*b* has, formed therein, a fixing hole 96 into which the screw 95 is screwed (FIG. 9). The reinforcing metal plate 82*c* has, formed therein, a through-hole 97 through which the screw 95 can pass with play. The reinforcing metal plate 82*c* is fixed to the base member 82*b* such that a positioning projection 82*b*1 formed on the base member 82*b* fits into a positioning hole 82*c*1 provided in the reinforcing metal plate 82*c*. As a result, the through-hole 97 in the reinforcing metal plate 82*c* is aligned with the fixing hole 96 so that the screw 95 can be screwed into the fixing hole 96 in the base member 82*b*.

As described above, the adjustment hole 94 provided in the base portion 93 of the cam follower member 90 is formed as a slotted hole elongated in a direction that intersects (is substantially orthogonal to, according to the present embodiment) the rotational axis direction of the cam shaft 84.

Therefore, after adjusting the position of the cam follower member 90 relative to the base member 82*b* by moving the cam follower member 90 in a direction closer to or away from the cam shaft 84 (the rotational axis of the cam 83), the cam follower member 90 can be fixed to the base member 82*b* with the screw 95.

Only the configuration related to the front cam follower member 90 is illustrated in FIGS. 8 and 9. However, according to the present embodiment, a similar configuration is applied to the rear cam follower member 90, that is, a configuration that is substantially symmetrical to the above-described configuration with respect to the center of the intermediate transfer belt 31 in the width direction.

The positions of the cam follower members 90 can be fixed to be at sufficiently the same distance to the common rotational axis of the two cams 83 using an adjustment jig. Thereafter, the members, such as the pressing member 70, can be assembled to the holding device 82 with the position of the cam follower member 90 fixed, and the holding device 82 can be assembled to the image forming apparatus 100 and the intermediate transfer belt unit 30.

Figure 10:
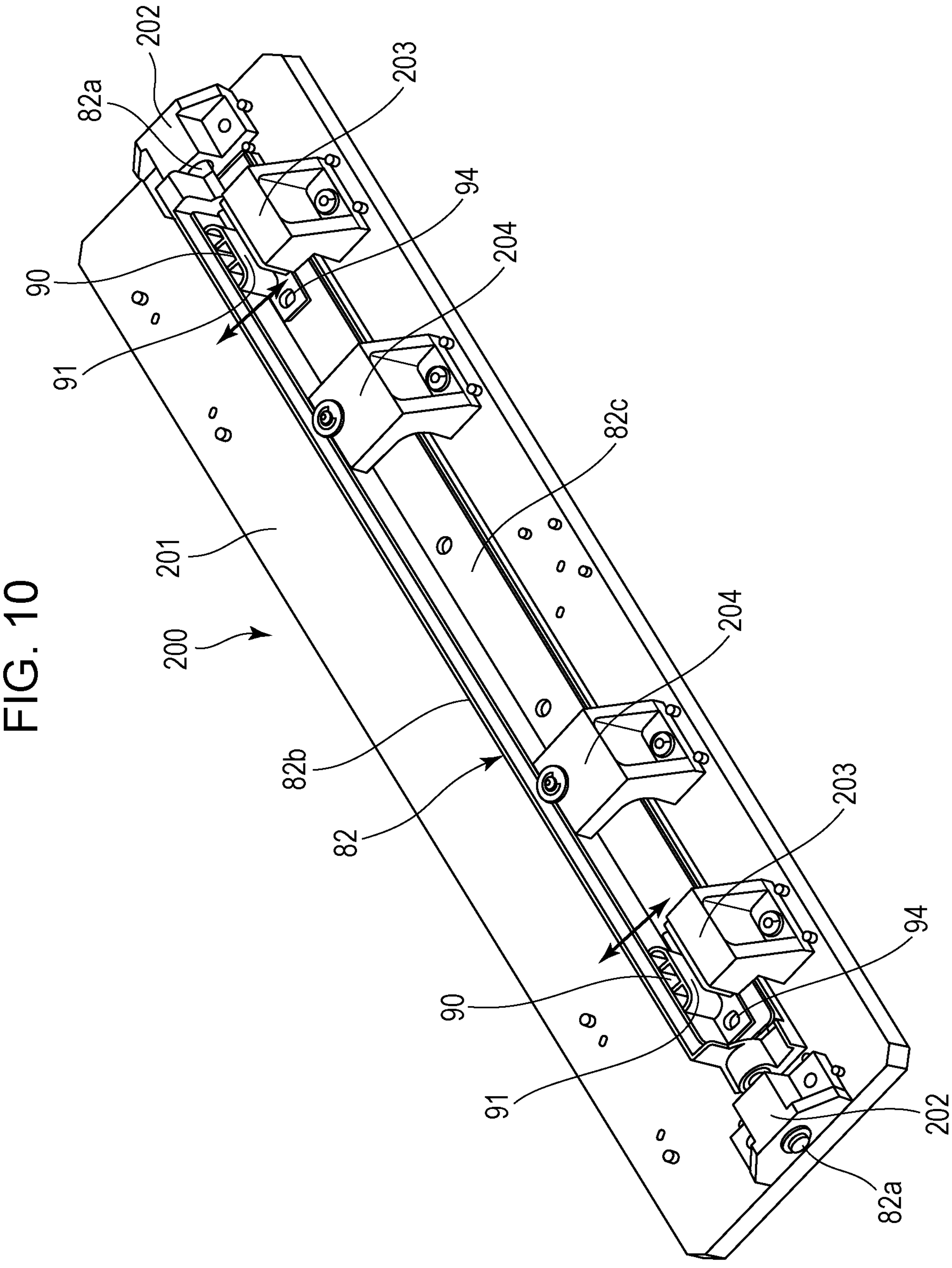
FIG. 10 is a perspective view of a jig for adjusting the position of the cam follower member.

FIG. 10 is a perspective view of an example of a jig 200 for adjusting the position of the cam follower member 90.

According to the present embodiment, the holding device 82 is set in the jig 200 with the reinforcing metal plate 82*c* attached to the base member 82*b*, and the adjustment assembly of the cam follower member 90 is performed. The jig 200 includes a board portion 201 having the holding device 82 placed thereon. The jig 200 further includes two rotating shaft positioning units 202 that are provided on the board portion 201 at either end portion of the base member 82*b* of the holding device 82 in the longitudinal direction and that determine the positions of the rotating shafts 82*a*. The jig 200 further includes two jig abutting portions 203 that are simulated as the cams 83 of the moving mechanism 81. The two jig abutting portions 203 are provided on the board portion 201. The positions of the jig abutting portions 203 relative to the above-described rotating shaft positioning units 202 are determined so as to have a positional relationship that sufficiently matches that in the moving mechanism 81.

To assemble the cam follower member 90 to the holding device 82, the rotating shafts 82*a* at either end portion in the longitudinal direction of the base member 82*b* having the reinforcing metal plate 82*c* fixed thereto are held by the rotating shaft positioning units 202, and the base member 82*b* is set on the board portion 201. Then, each of the cam follower members 90 is placed on the reinforcing metal plate 82*c* so that the adjustment hole 94 of the cam follower member 90, the through-hole 97 of the reinforcing metal plate 82*c*, and the fixing hole 96 of the base member 82*b* are aligned, and the cam follower member 90 is temporarily fixed with the screw 95. That is, the screw 95 is inserted into the through-hole 97 and the adjustment hole 94, and rough positioning is performed so that the cam follower member 90 can be moved in the longitudinal direction of the adjustment hole 94 which is a slotted hole. Thereafter, the cam follower member 90 is moved relative to the base member 82*b* so that the abutted surface 91 of the cam follower member 90 abuts against the jig abutting portion 203. Then, the screw 95 is sufficiently screwed into the fixing hole 96 of the base member 82*b* with the cam follower member 90 properly abutting the jig abutting portions 203 and, thus, the cam follower member 90 is fixed to the base member 82*b* with the screw 95.

To prevent the base member 82*b* from being displaced about the rotating shaft 82*a* in the rotary direction during, for example, position adjustment of the cam follower member 90, the jig 200 includes a pressing portion 204 to press the base member 82*b* against the board portion 201 of the jig 200.

According to the present embodiment, each of the two abutted portions is provided on one of the cam follower members 90 whose positions are adjustable. However, one of the abutted portions may be provided on the cam follower member 90 whose position is adjustable, and the other may be provided in the holding device (e.g., the base member) so that the position is not adjustable. Alternatively, the position of one of the two cam follower members 90 each having an abutted portion may be adjustable, while the other may be fixed at a fixed position so that the position is not adjustable.

According to the present embodiment, the cam follower member 90 can be steplessly and continuously repositioned within a predetermined range and be fixed in the holding device 82. However, the configuration is not limited thereto, and the cam follower member 90 may be repositioned stepwise and be fixed.

According to the present embodiment, a slotted hole serves as a relief cut portion that gives clearance to the screw 95 so that the cam follower member 90 can move. However, the relief cut portion is not limited to a slotted hole the entire area of which is enclosed but may be a groove (a notch) that is partially open around the periphery. In an opposite way to the present embodiment, a relief cut portion, such as a slotted hole, may be provided in the base member 82*b*, and a fixing hole may be provided in the cam follower member 90. Then, the screw 95, may be inserted from the side adjacent to the base member 82*b* for fixing, for example.

Figure 11:
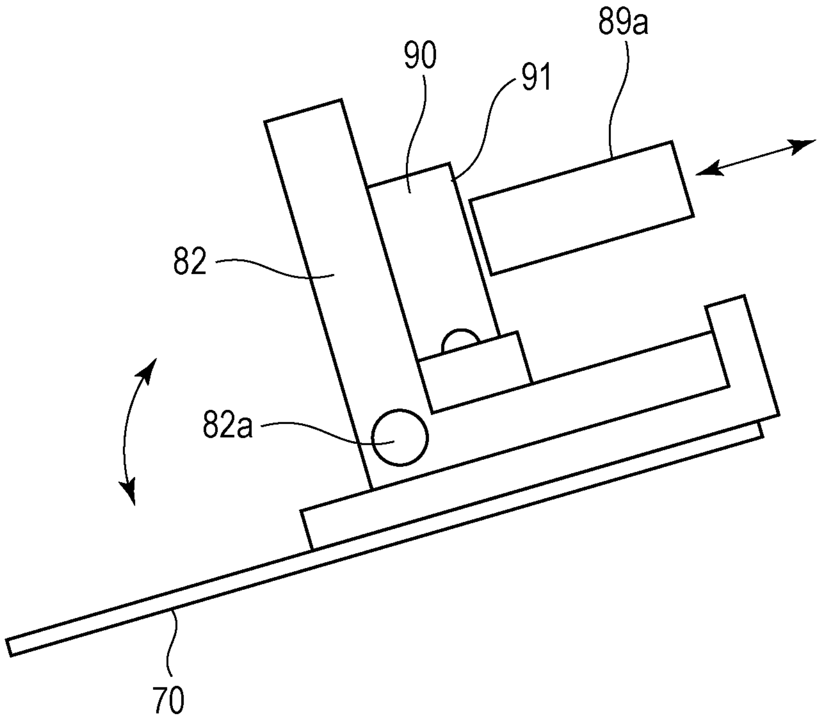
FIG. 11 is a schematic illustration according to a modification.

According to the present embodiment, the abutting portion of the moving device 89 is provided on the cam 83 that is rotatable. However, as illustrated in FIG. 11, for example, the abutting portion of the moving device 89 may be provided on the moving portion 89*a* that is slidingly movable by a solenoid or the like. Similarly, the holding device 82 is not limited to being rotatable, but may be, for example, slidingly movable if the position of the pressing member 70 can be changed in accordance with the intended use.

As described above, according to the present embodiment, the image forming apparatus 100 includes a rotatable seamless intermediate transfer belt 31 configured to bear a toner image, a plurality of tension rollers configured to support the intermediate transfer belt 31 in a tensioned state, where the tension rollers include the secondary transfer inner roller 32 and the pre-secondary transfer roller 35 disposed adjacent to and upstream of the secondary transfer inner roller 32 in the rotation direction of the intermediate transfer belt 31, the secondary transfer outer roller 41 disposed facing the secondary transfer inner roller 32, where the secondary transfer outer roller 41 abuts against the outer circumferential surface of the intermediate transfer belt 31 and forms the secondary transfer unit N2 that transfers the toner image from the intermediate transfer belt 31 onto the recording medium P, the pressing member 70 capable of being in contact with the inner circumferential surface of the intermediate transfer belt 31 in the width direction of the intermediate transfer belt 31 at a position upstream of the secondary transfer inner roller 32 and downstream of the pre-secondary transfer roller 35 in the rotation direction of the intermediate transfer belt 31 and pressing the intermediate transfer belt 31 in a direction from the inner circumferential surface toward the outer circumferential surface, the movable holding device 82 that holds the pressing member 70, and the moving device 89 that moves the pressing member 70 by moving the holding device 82. In addition, according to the present embodiment, the moving device 89 includes the cams 83 at at least two locations in the width direction of the intermediate transfer belt 31. The cams 83 abut against the holding device 82 and regulate the position of the holding device 82 in the movement direction of the holding device 82. The holding device 82 includes the abutted surfaces 91 against which the cams 83 abut at at least two locations in the width direction of the intermediate transfer belt 31. At least one of the at least two abutted surfaces 91 is provided on the cam follower member 90 of the holding device 82 configured to be fixable at one of a plurality of positions at different distances of the abutted surface 91 from the cam 83.

According to the present embodiment, the abutted surfaces 91 at at least two locations are provided on different cam follower members 90 configured to be fixable at one of a plurality of positions at different distances of the abutted surface 91 from the cam 83 in the holding device 82. However, at least one of the abutted surfaces 91 at at least two locations may be provided so that its position in the holding device 82 cannot be changed.

According to the present embodiment, the holding device 82 includes a base member 82*b* to which the cam follower member 90 is fixed and the screw 95 that fixes the cam follower member 90 to the base member 82*b*, and one of the base member 82*b* and the cam follower member 90 includes the adjustment hole 94 that gives clearance to the screw 95 so that the cam follower member 90 can move relative to the base member 82*b*. In addition, according to the present embodiment, the holding device 82 is rotatable about the pivotal axis extending in the width direction of the intermediate transfer belt 31. According to the present embodiment, the moving device 89 includes a cam 83 that is rotatable about the pivotal axis extending in the width direction of the intermediate transfer belt 31 and that has the above-described abutting portion, and the cam follower member 90 is configured to be fixable at one of a plurality of positions at different distances of the abutted surface 91 from the pivotal axis of the cam 83 in the holding device 82. According to the present embodiment, the pressing member 70 consists of a plate member that is disposed such that the longitudinal direction thereof is substantially parallel to the width direction of the intermediate transfer belt 31. The upstream lateral end portion of the pressing member 70 in the rotation direction of the intermediate transfer belt 31 is held by the holding device 82, and the downstream lateral end portion of the pressing member 70 in the rotation direction of the intermediate transfer belt 31 is contactable with the inner circumferential surface of the intermediate transfer belt 31.

As described above, according to the present embodiment, the moving mechanism 81 causes the cam 83 to abut against the cam follower member 90 provided in the holding device 82 so as to change the posture of the holding device 82. According to the present embodiment, the front and rear cam follower members 90, which define the amount of pressure (the inroad amount) of the pressing member 70 on the intermediate transfer belt 31, are each composed of a member different from the holding device 82, and the positions of the cam follower members 90 relative to the rotational axis of the cam 83 can be adjusted. Since the holding device 82 has a relatively large number of parts, the tolerances are summed and, thus, the accuracy of the positional relationship between the abutted portion and the abutting portion may decrease. By adjusting the distance of the abutted portion to the abutting portion in the holding device 82, the decrease in accuracy of the positional relationship can be effectively reduced (improved). Since the cam 83 has a relatively small number of parts, a displacement in the positional relationship that is to be adjusted in the cam 83 is sufficiently small in many cases. As described above, the position of the cam follower member 90 can be changed, and the position can be adjusted so that there is no difference in the amount of pressure (the inroad amount) of the pressing member 70 on the intermediate transfer belt 31 on the front side and the rear side when the apparatus is assembled. This can reduce the influence of the difference in the amount of pressure (the inroad amount) of the pressing member 70 on the intermediate transfer belt 31 on the front side and the rear side.

Others

While the present disclosure has been described with reference to a particular embodiment, the present disclosure is not limited to the above-described embodiment.

While the above embodiment has been described with reference to two cams that move the holding device, one on the front side and the other on the rear side, the number of cams may be increased as necessary. For example, a configuration may be employed in which three cams are provided: one on the front side, one on a rear side, and one in between. In this case, a cam follower member whose position is adjustable can be provided corresponding to each of the cams.

According to the above-described embodiment, the cam has a stepless surface whose radius varies uniformly from the center of rotation. However, any shape that adjusts (changes) the posture of the holding device can be employed in accordance with an intended use.

As the pressing member, for example, a roller made of an elastic material, such as sponge or rubber, or a roller made of a rigid material, such as resin or metal, can be employed. However, from the viewpoint of placing the pressing member sufficiently close to the secondary transfer unit, it is desirable that the pressing member be a plate-like member as used in the above-described embodiment. Alternatively, a thin metal plate can be used as the pressing member.

According to the above-described embodiment, a secondary transfer outer roller in direct contact with the outer circumferential surface of the intermediate transfer belt is used as a secondary transfer outer member that forms the secondary transfer unit together with the secondary transfer inner roller serving as the secondary transfer inner member. However, as the secondary transfer outer member, a secondary transfer outer roller and a secondary transfer belt stretched between the secondary transfer outer roller and another roller may be used. Then, for example, the secondary transfer outer roller can abut against the outer circumferential surface of the intermediate transfer belt via the secondary transfer belt. According to the configuration, the secondary transfer unit is formed by nipping the intermediate transfer belt and the secondary transfer belt by the secondary transfer inner roller in contact with the inner circumferential surface of the intermediate transfer belt and the secondary transfer outer roller in contact with the inner circumferential surface of the secondary transfer belt. In this case, the contact portion between the intermediate transfer belt and the secondary transfer belt is the secondary transfer unit (a secondary transfer nip).

While the above embodiment has been described with reference to the belt-like image bearing member being an intermediate transfer belt, the present disclosure can be applied to any image bearing member in the form of a seamless belt that conveys a toner image deposited at the image formation position. As a belt-like image bearing member, in addition to the intermediate transfer belt according to the above-described embodiment, a photosensitive belt or an electrostatic recording dielectric belt can be used, for example.

The present disclosure can also be implemented by another embodiment in which some or all of the configurations of the above embodiment are replaced by alternative configurations. Therefore, the present disclosure can be implemented in any image forming apparatus that uses a belt-like image bearing member regardless of the tandem type/one drum type, charging method, electrostatic image formation method, development method, transfer method, and fixing method. While the above embodiment has been described with reference to the main units related to toner image formation and transfer, the present disclosure can be implemented in various applications, such as printers, various printing machines, copying machines, fax machines, and multifunction peripherals by adding necessary devices, equipment, and chassis structure to the main units.

According to the present embodiment, it is possible to reduce the occurrence of the difference in amount of pressure the pressing member exerts against the belt in the longitudinal direction of the pressing member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102275 filed Jun. 24, 2022, which is hereby incorporated by reference herein in its entirety.

What is claimed is:

1. An image forming apparatus comprising:

an endless belt that is rotatable and configured to bear a toner image;

a plurality of tension rollers configured to support the belt in a tensioned state, wherein the plurality of tension rollers includes an inner roller and an upstream roller disposed adjacent to and upstream of the inner roller in a rotation direction of the belt;

an outer member disposed facing the inner roller, wherein the outer member abuts against an outer circumferential surface of the belt and forms a transfer unit configured to transfer the toner image from the belt to a recording medium;

a pressing member contactable with an inner circumferential surface of the belt in a width direction of the belt at a position upstream of the inner roller and downstream of the upstream roller in the rotation direction of the belt, wherein the pressing member is capable of pressing the belt in a direction from the inner circumferential surface toward the outer circumferential surface;

a holding mechanism that is movable and configured to hold the pressing member;

a cam member configured to move the holding mechanism; and a cam follower member fixed to the holding mechanism to be configured to be moved with the holding member by the cam member, wherein the cam follower member is fixable at a position different from a position at which the cam follower member is fixed to the holding mechanism so that a position of the cam follower member relative to the cam member located at a predetermined position is adjustable.

2. The image forming apparatus according to claim 1, wherein the cam member includes a first cam member provided in one end portion of the pressing member in a longitudinal direction of the pressing member so as to move the pressing member via the cam follower member and a second cam member provided in the other end portion of the pressing member in the longitudinal direction of the pressing member so as to move the pressing member via the cam follower member, and wherein the cam follower member includes a first cam follower member configured to be moved by the first cam member and a second cam follower member configured to be moved by the second cam member.

3. The image forming apparatus according to claim 2, wherein the first cam follower member is fixable at a position different from a position at which the first cam follower member is fixed to the holding mechanism so that the position of the pressing member relative to the first cam member located at a first predetermined position is adjustable, and wherein the second cam follower member is fixable at a position different from a position at which the second cam follower member is fixed to the holding mechanism so that the position of the pressing member relative to the second cam member located at a second predetermined position is adjustable.

4. The image forming apparatus according to claim 2, wherein the first cam follower member is fixable at a position different from a position at which the first cam follower member is fixed to the holding mechanism so that the position of the pressing member relative to the first cam member located at a first predetermined position is adjustable, and wherein the second cam follower member is configured so that a position of the second cam follower member fixed to the holding mechanism is not changeable.

5. The image forming apparatus according to claim 1, wherein the holding mechanism includes a base member to which the cam follower member is fixed and a fixture for fixing the cam follower member to the base member, and wherein one of the base member and the cam follower member has one of a through-hole and a notch through which the fixture passes, and the one of the through-hole and the notch has a space that allows the cam follower member to move relative to the base member.

6. The image forming apparatus according to claim 1, wherein the holding mechanism is rotatable about a pivotal axis extending in the width direction of the belt.

7. The image forming apparatus according to claim 1, wherein the cam follower member is configured to be fixable at one of a plurality of positions at different distances from a pivotal axis of the cam member.

8. The image forming apparatus according to claim 1, wherein the pressing member is formed as a plate member disposed such that a longitudinal direction of the pressing member is substantially parallel to the width direction of the belt, a lateral end portion of the pressing member that is an upstream end portion in the rotation direction of the belt is held by the holding mechanism, and a lateral end portion of the pressing member that is a downstream end portion in the rotation direction of the belt is capable of contacting the inner circumferential surface of the belt.

* * * * *